Figures 46, 47:
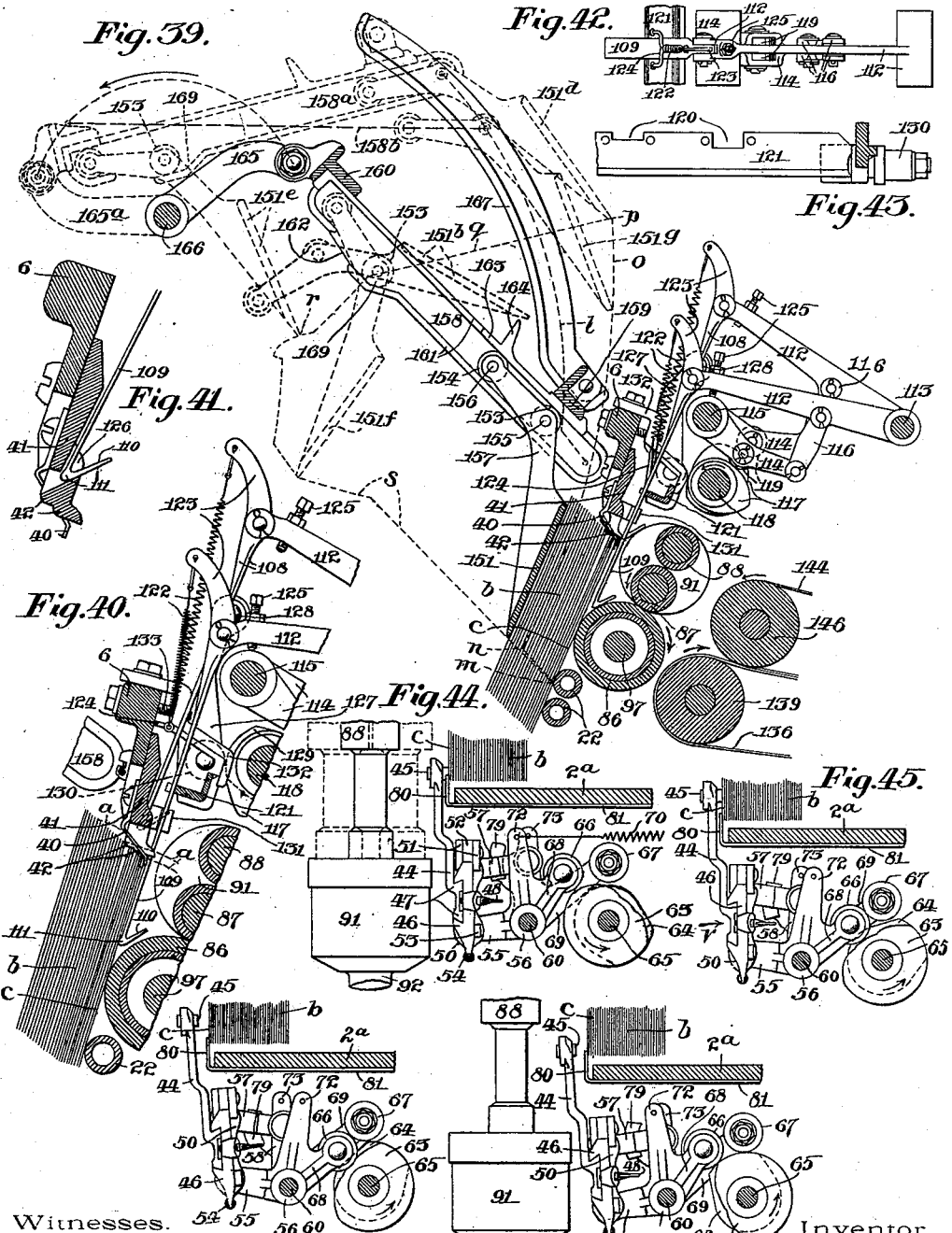

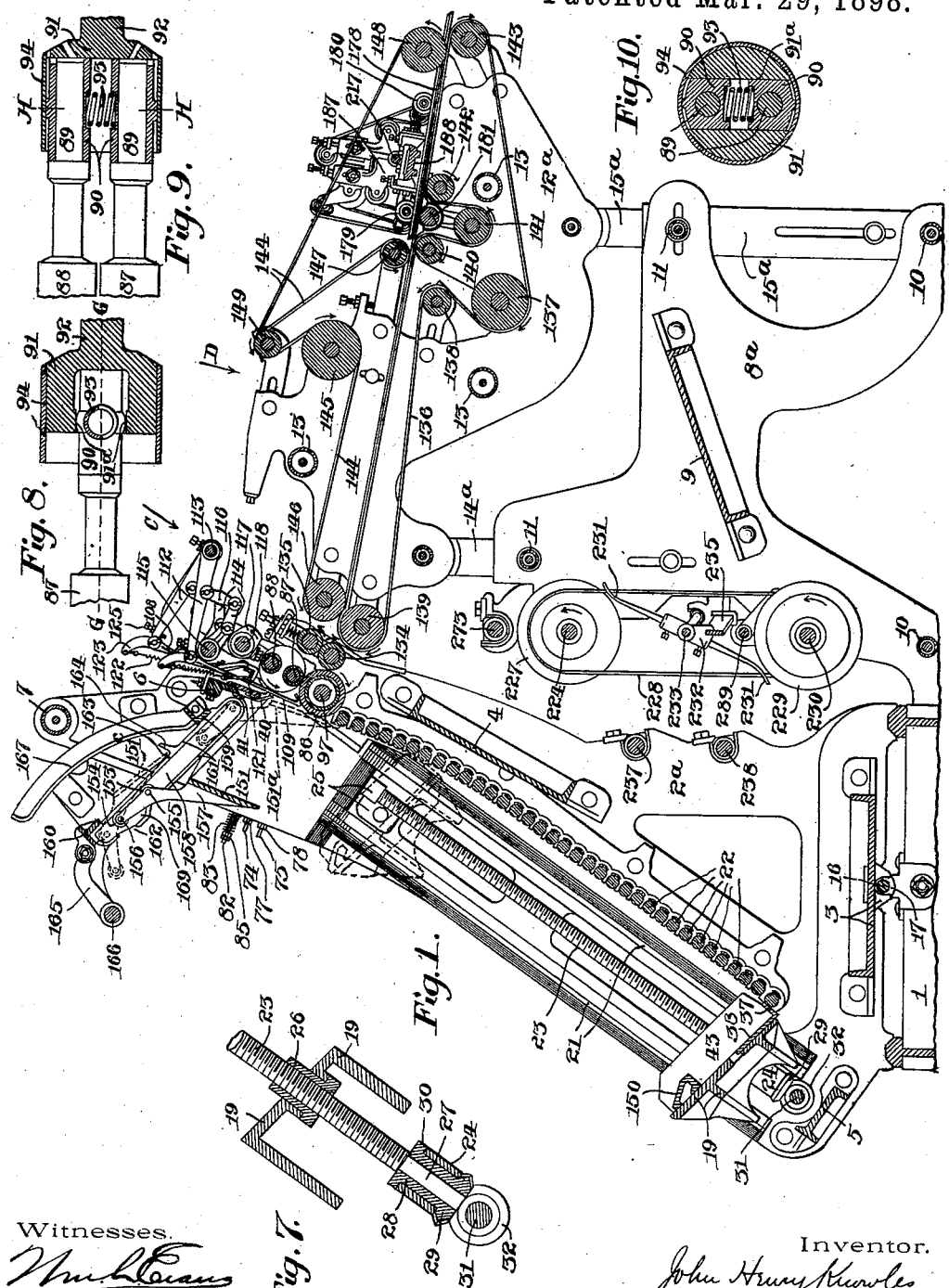

(No Model.) 9 Sheets—Sheet 2.
J. H. KNOWLES.
MECHANISM FOR SEPARATELY REMOVING SHEETS OF PAPER, &c.
No. 601,266. Patented Mar. 29, 1898.
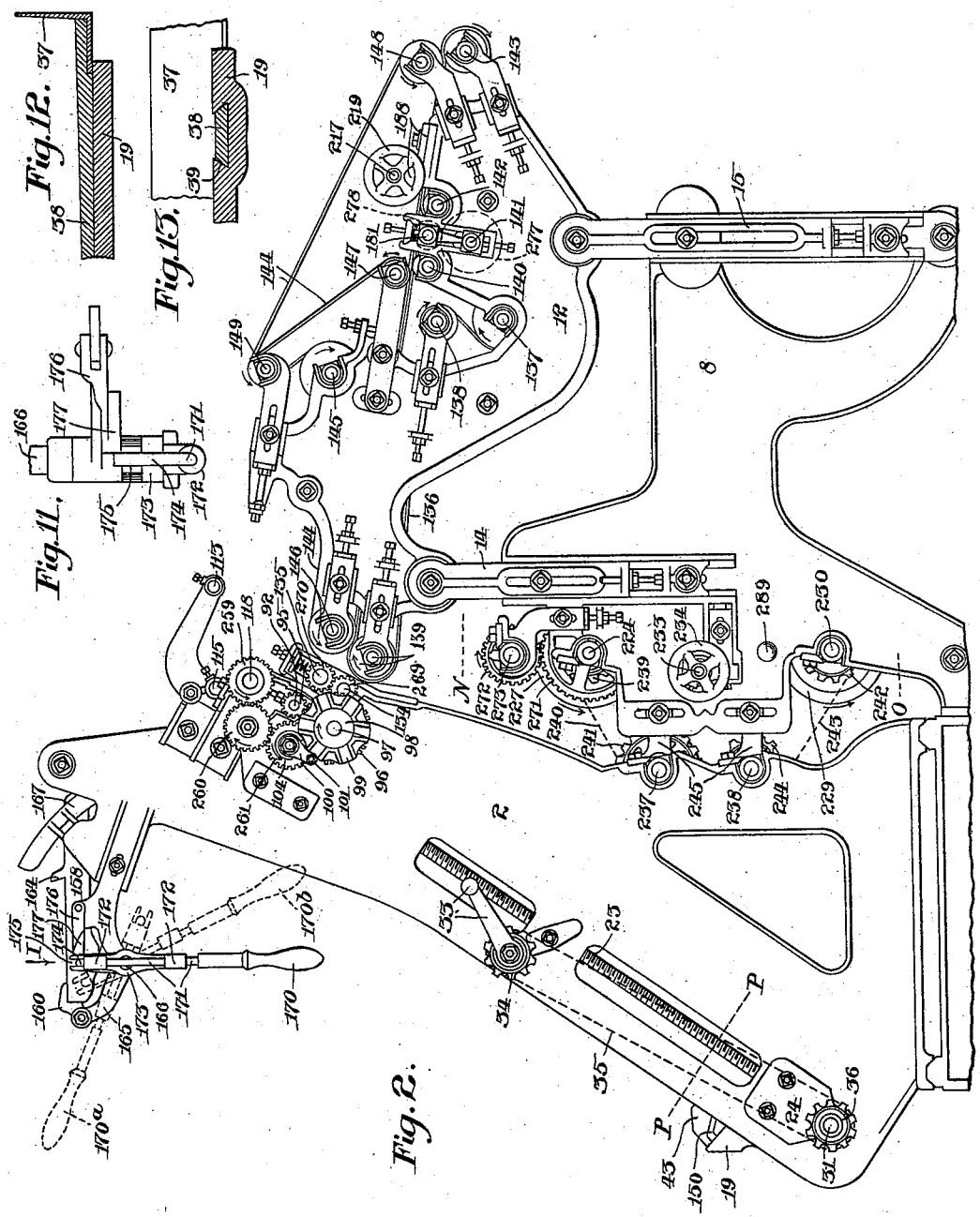
Witnesses.
Inventor.
John Henry Knowles
By
Attorney.

(No Model.)  
9 Sheets—Sheet 3.
J. H. KNOWLES.
MECHANISM FOR SEPARATELY REMOVING SHEETS OF PAPER, &c.
No. 601,266.  
Patented Mar. 29, 1898.
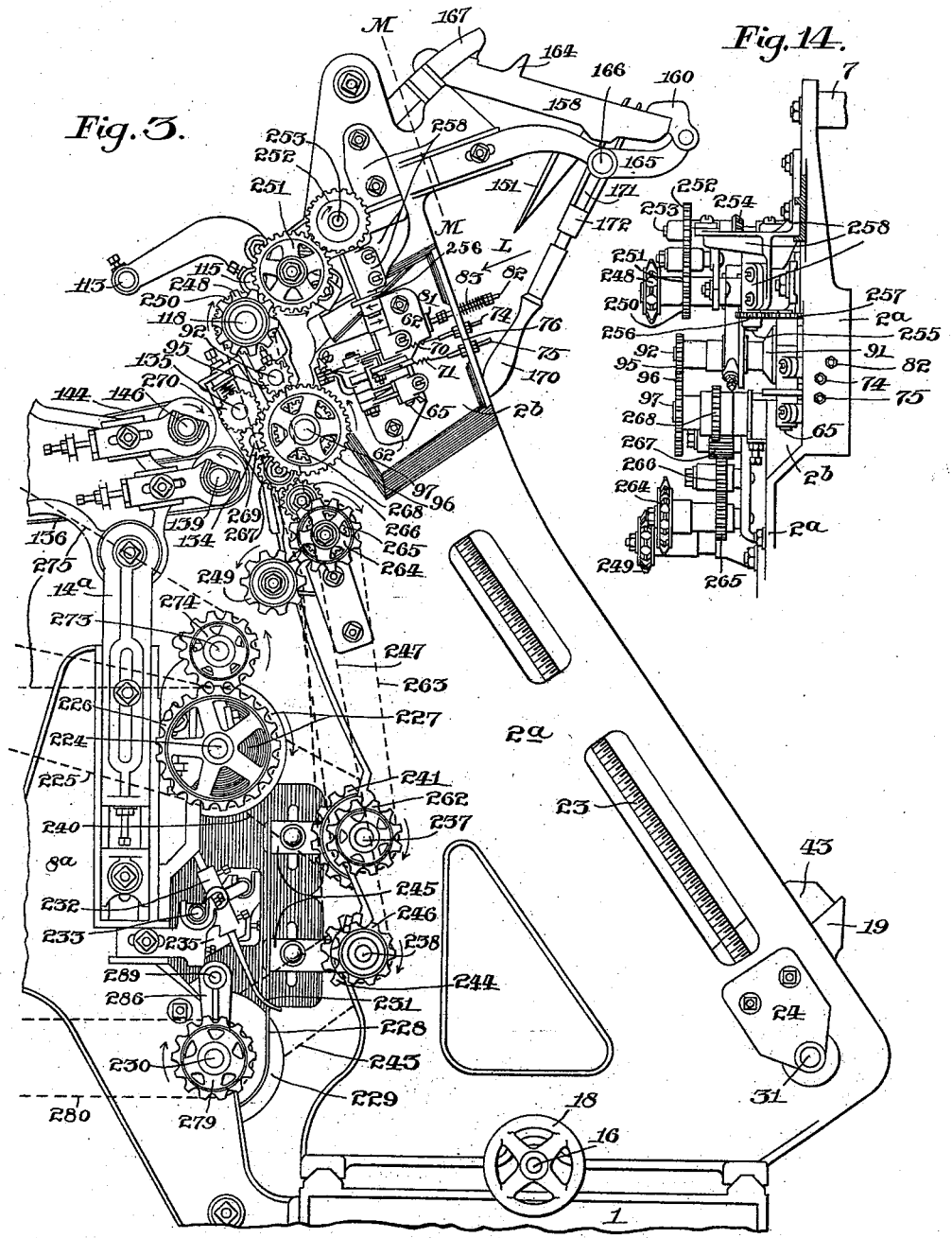
Witnesses.  
Inventor.  
Attorney.

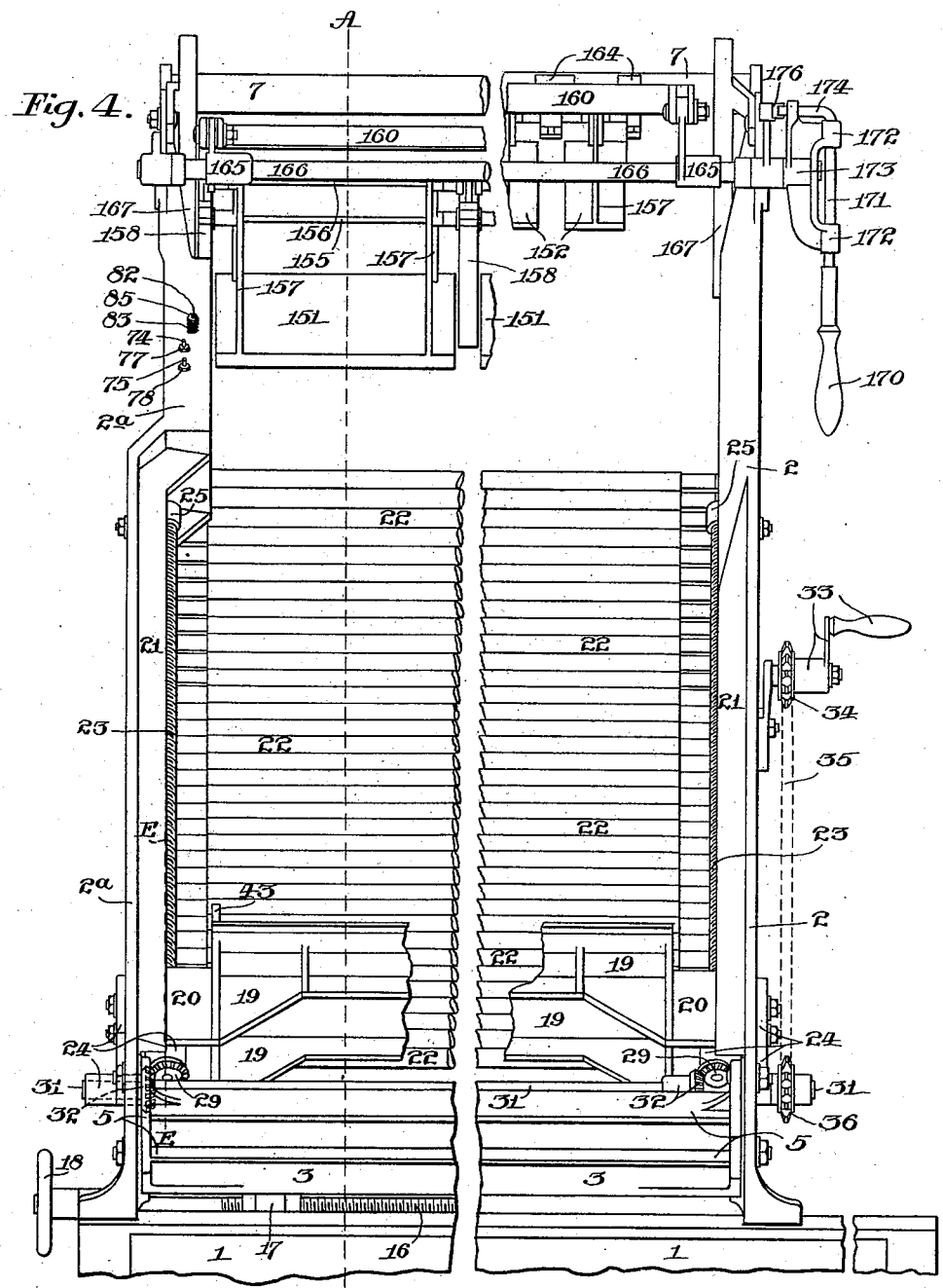

(No Model.) 9 Sheets—Sheet 5.
J. H. KNOWLES.
MECHANISM FOR SEPARATELY REMOVING SHEETS OF PAPER, &c.
No. 601,266. Patented Mar. 29, 1898.
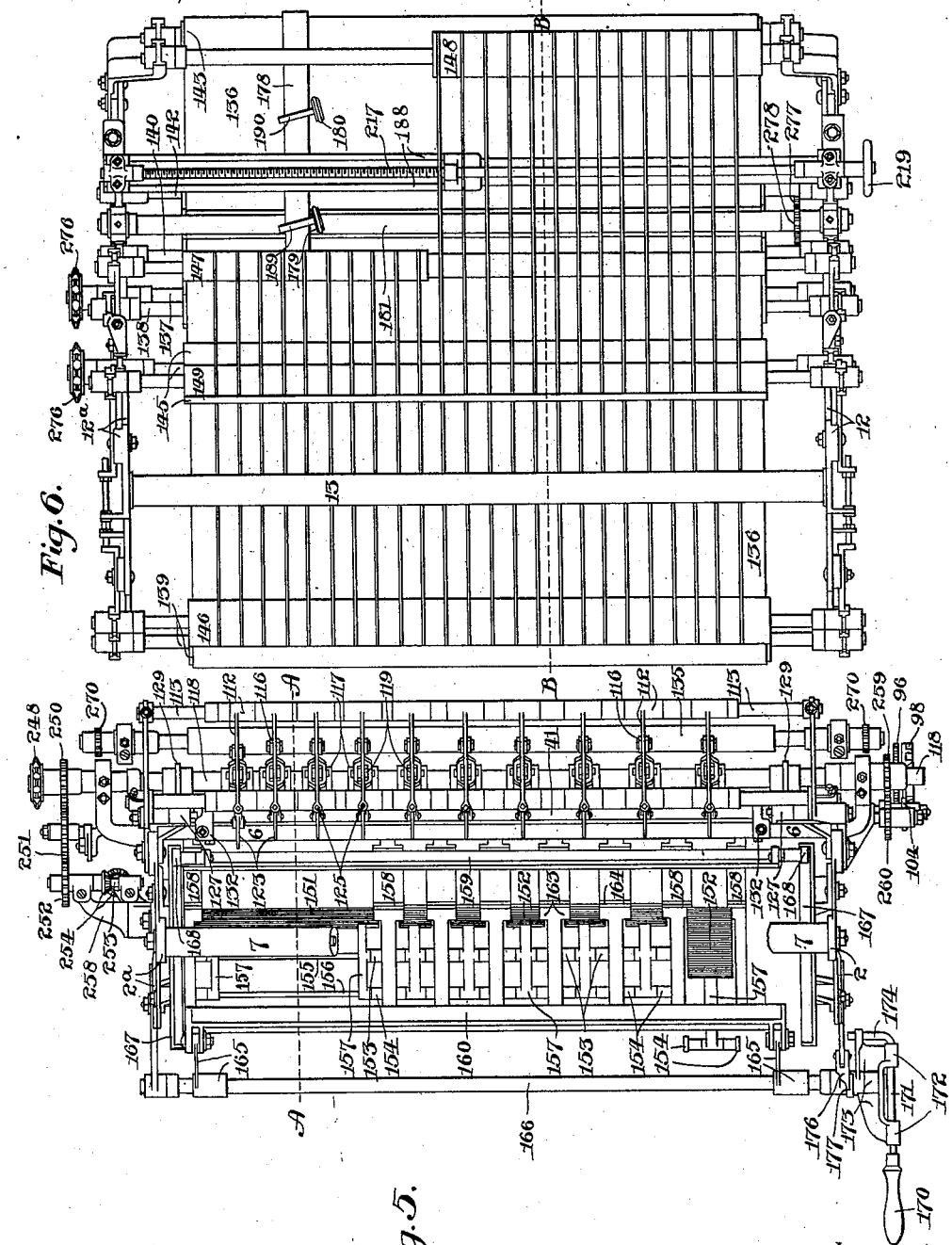
Fig. 6.
Fig. 5.
Witnesses.
Inventor.
Attorney.

(No Model.) 9 Sheets—Sheet 6.
J. H. KNOWLES.
MECHANISM FOR SEPARATELY REMOVING SHEETS OF PAPER, &c.
No. 601,266. Patented Mar. 29, 1898.
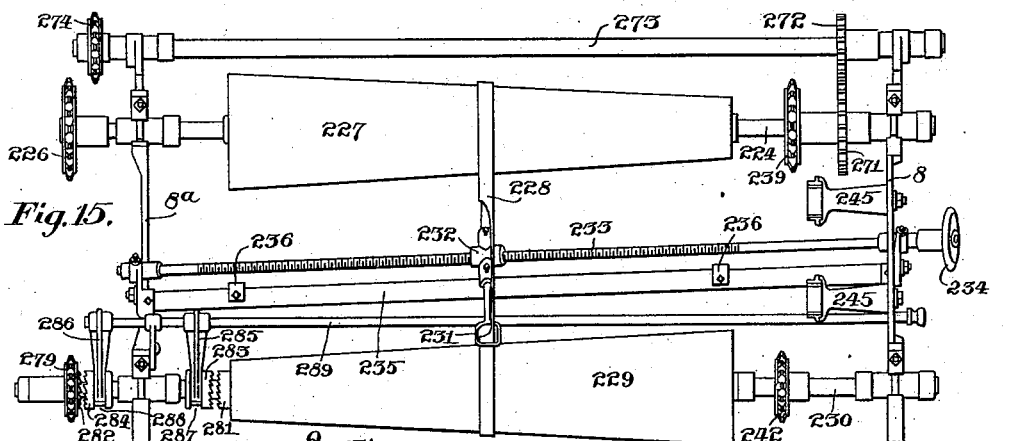
Fig. 15.
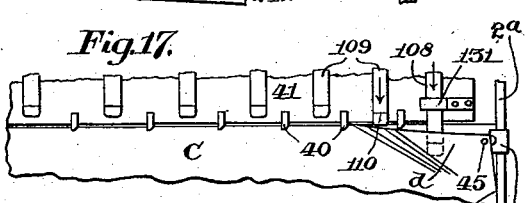
Fig. 17.
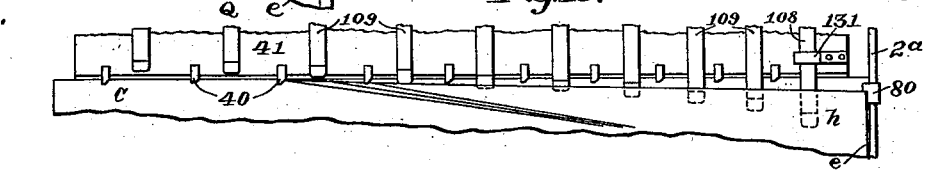
Fig. 16. Fig. 18.
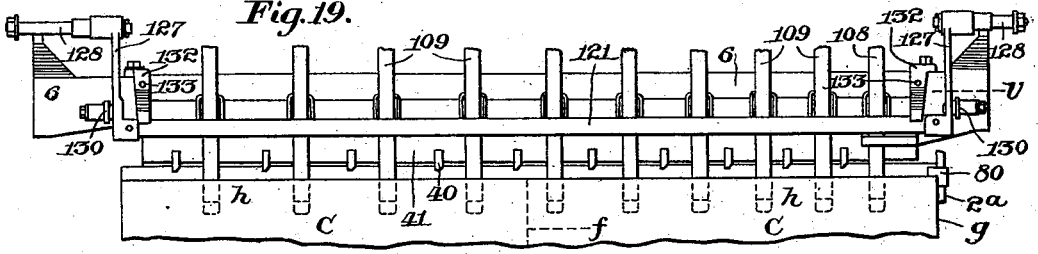
Fig. 19.
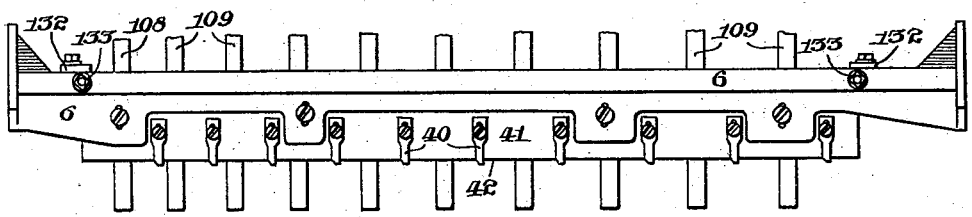
Fig. 20.
Witnesses. Inventor.
Attorney.

(No Model.) 9 Sheets—Sheet 7.

J. H. KNOWLES.
MECHANISM FOR SEPARATELY REMOVING SHEETS OF PAPER, &c.

No. 601,266. Patented Mar. 29, 1898.

Witnesses.

Inventor.

Attorney.

(No Model.) 9 Sheets—Sheet 8.

J. H. KNOWLES.
MECHANISM FOR SEPARATELY REMOVING SHEETS OF PAPER, &c.

No. 601,266. Patented Mar. 29, 1898.

Witnesses. Inventor.

Attorney.

(No Model.) 9 Sheets—Sheet 9.
J. H. KNOWLES.
MECHANISM FOR SEPARATELY REMOVING SHEETS OF PAPER, &c.
No. 601,266. Patented Mar. 29, 1898.
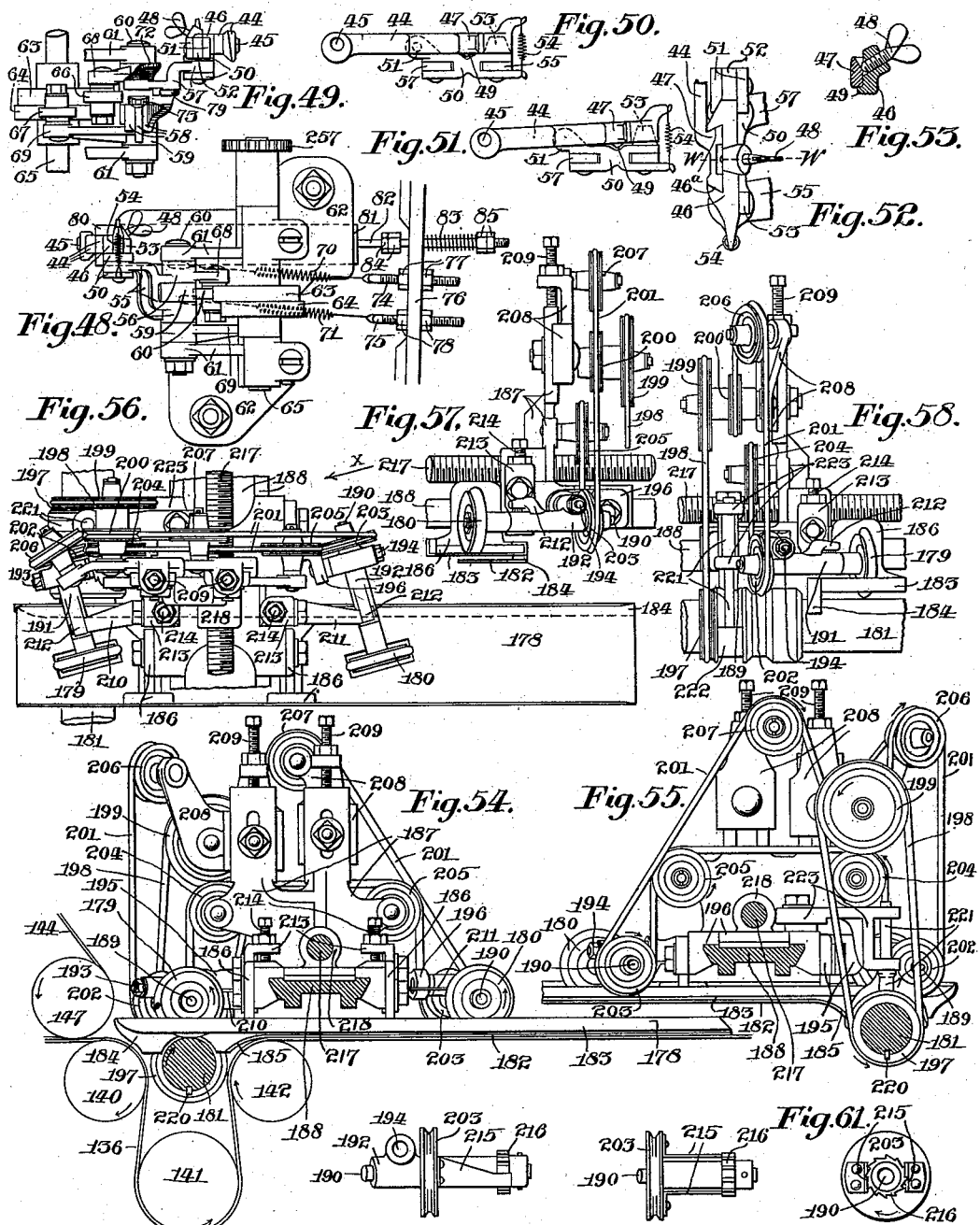
Witnesses. Inventor.
Attorney.

UNITED STATES PATENT OFFICE.

JOHN HENRY KNOWLES, OF PHILADELPHIA, PENNSYLVANIA.

MECHANISM FOR SEPARATELY REMOVING SHEETS OF PAPER, &c.

SPECIFICATION forming part of Letters Patent No. 601,266, dated March 29, 1898.

Application filed February 25, 1897. Serial No. 625,030. (No model.)

*To all whom it may concern:*

Be it known that I, JOHN HENRY KNOWLES, of the city and county of Philadelphia and State of Pennsylvania, have invented an Improvement in Mechanism for Separately Removing Sheets of Paper, &c., of which the following is a specification.

My invention relates to mechanism for separately removing sheets of paper, &c., from a pack or pile and delivering them singly to any machine to which it is desired to supply successive sheets.

I have shown my invention embodied in an organized machine designed for separating the sheets from the pack or pile and delivering them in an accurately-registered condition to the machine to be fed; but the mechanism may, if desired, be embodied in and become a part of the machine, which acts upon the separately-fed sheets.

My invention consists of certain features of construction and combination of parts, all of which are fully set forth and claimed hereinafter.

I shall now refer to the accompanying drawings, forming part of this specification, in which—

Figures 1, 2, 5, 6, and 15 are on the same scale and illustrate the general relation of parts. The other figures, in order to show details more clearly, are made on more or less enlarged scales. Fig. 1 is a longitudinal vertical section of so much of a sheet-feeding machine as is necessary to illustrate my present invention and is taken partly on the line A A, Figs. 4, 5, and 16, and partly on the line B B, Fig. 6. Fig. 2 is a side elevation of the same. Fig. 3 is a view, similar to Fig. 2, of a portion of that side of the machine opposite to Fig. 2. Fig. 4 is a rear elevation of a portion of the machine. Fig. 5 is a plan view looking in the direction of the arrow C in Fig. 1 of the sheet-holder and attached parts. Fig. 6 is a plan view looking in the direction of the arrow D in Fig. 1 of the sheet-conveying device. Fig. 7 shows a detail in vertical section taken on the line E E, Fig. 4. Figs. 8, 9, and 10 show details in sections taken, Fig. 8, on the line F F or F F in Fig. 22, Fig. 9 on the line G G in Fig. 8, and Fig. 10 on the line H H in Fig. 9. Fig. 11 is a plan view of a detail, looking in the direction of the arrow I in Fig. 2. Figs. 12 and 13 are vertical sections on the lines J J and K K, respectively, in Fig. 21. Fig. 14 is a rear elevation of a portion of the machine, looking in the direction of the arrow L in Fig. 3, and is partly in section on the line M M in Fig. 3. Fig. 15 is a rear elevation of that portion of the machine which lies between the lines N and O in Fig. 2. Figs. 16, 17, 18, and 19 are front elevations of the upper portion of a pack of sheets in the sheet-holder and of adjacent parts of the machine. Fig. 20 is a rear elevation of parts shown in Fig. 19. Fig. 21 is a plan view of the pack-supporting table and is partly in section on the line P P, Fig. 2. Fig. 22 is a front elevation of a portion of the sheet-withdrawing devices. Figs. 23 to 31 are vertical sections or diagrams illustrating the action of the sheet-withdrawing devices, and the line of section in these figures is taken through the center of the buckle in the sheet, as on the line Q Q, and looking in the direction of the arrow R in Fig. 16. Figs. 32 to 37 are views, similar to a portion of Fig. 2, of the mechanism which drives intermittently a portion of the withdrawing devices. Fig. 38 is a section on the line S S in Fig. 34. Fig. 39 is a longitudinal vertical section similar to a portion of Fig. 1. Fig. 40 is a section similar to a portion of Fig. 39. Fig. 41 is a view similar to a portion of Fig. 40, but with the line of section taken on the line T T, Fig. 16. Figs. 42 and 43 are plan views, respectively, of one of the sheet-separating fingers and its operating parts and of an end of the finger-clamping bar, the latter view being partly in section on the line U, Fig. 19. Figs. 44, 45, 46, and 47 are plan views of the buckling device. Fig. 48 is a face view of the buckling device and is similar to a portion of Fig. 3. Fig. 49 is a view, similar to Fig. 48, of the opposite face of the buckling device. Figs. 50 and 51 are views of the buckling-finger, looking in the direction of the arrow V in Fig. 45. Fig. 52 is a view similar to a portion of Fig. 45. Fig. 53 is a vertical section taken on the line W W, Fig. 52. Fig. 54 is a side elevation, similar to a portion of Fig. 1, of the registering device. Fig. 55 is a view, similar to Fig. 54, of the opposite side of the registering device. Figs. 56, 57, and 58 are respectively plan, front, and rear views of the registering device. Figs. 59 and 60 are views, looking in the direction of the arrow X in Fig. 56, of the ratchet-driving of the registering-disks; and Fig. 61 is an end view of parts shown in Figs. 59 and 60.

*The Frame of the Machine.*

1 is a base-piece which supports the adjustable sheet-holder.

2 2ª are the side frames of the sheet-holder, which may be connected by cross-braces 3 4 5 6 7.

8 8ª are the side frames of that portion of the machine which lies forward of the base-piece 1, and they may be connected by cross-braces 9, 10 10, 11 11.

12 12ª are the side pieces of the cradle which supports the sheet-conveyer, and they may be connected by the cross-braces 13 13 13 and may be supported from the side frames 8 8ª by rear standards 14 14ª and by forward standards 15 15ª.

*The Sheet Holding and Supporting Devices.*

In the drawings I have shown the preferable construction of the sheet-holding devices; but it will be readily understood that these devices may be modified and varied in construction without in any way affecting the other portions of my invention. The devices shown are designed to hold a pack of sheets on edge in a forwardly-inclined position.

The sheet-holder rests upon and is adjustable along suitable guideways formed on the base-piece 1 and may be so adjusted in any suitable manner, as by the screw 16, operating in a threaded nut 17, secured in the cross-brace 3. The screw 16 may be turned by a hand-wheel 18 and may be held by a suitable bearing carried by the base-piece. When the sheet-holder is adjusted laterally, the pack of sheets is adjusted in reference to the medial line of the feeding-machine and of the machine which receives sheets therefrom. In the construction shown the sheet-conveyer does not partake of the lateral adjustment of the sheet-holder.

19 is the bottom of the sheet-holder, upon which the edges of the sheets rest, and is preferably inclined upwardly and rearwardly. When my improved sheet-feeding machine is arranged as shown, the sheets are drawn upward from the front of the holder, and it is necessary for the top edges of the sheets to lie always in the same plane. To maintain the top edges of the sheets always in the same plane, notwithstanding that packs of sheets of different lengths may from time to time be placed in the holder, I provide that the bottom 19 shall be vertically adjustable, as by means hereinafter described. In Fig. 1 the bottom 19 is shown by full lines in its lowest and by dotted lines in its highest position.

The front of the sheet-holder may consist of any suitable support arranged at the proper inclination to the bottom 19; but for the purpose of diminishing the friction between the sheets and the front of the holder while sheets are being withdrawn from the pack I prefer to construct the front of a series of idler-rollers 22, each of which is journaled in bearings carried by the side frames 2 2ª.

In the drawings, $b$ represents a portion of a pack of sheets in the holder, and $c$ represents the foremost sheet in the pack.

In Figs. 39 and 40 a portion of a pack of sheets $b$ is represented as bearing against the topmost rollers 22 of the roller front and as extending a proper distance thereabove for the proper operation of the withdrawing devices upon the foremost sheet $c$.

40 40 are a series of retaining clips or points arranged at intervals across the machine above the top of the front of the sheet-holder. When the pack of sheets is in its normal position in the sheet-holder, its foremost upper edge will be horizontally in a line slightly above the ends of said clips, which depend in front of the upper edge of the pack and serve to retain the upper edges of the foremost sheets in proper alinement.

The clips 40 may be attached to any convenient support—for instance, to the cross-brace 6. I have shown them carried by the cross-brace 6 through the medium of a transverse bar 41, which is adjustably connected to the cross-brace. The clips are all attached to the bar 41 and may be adjusted all together, when required, by the adjustment of the bar to regulate the vertical position of the upper edges of the foremost sheets in the pack to best adapt that position for the successful operation of the edge-bending devices upon the sheets.

The clips 40 are constructed and placed so that they may readily yield or bend under the action of the foremost sheet when that sheet is forcibly bent outward. In the drawings these clips are shown as small springs having the shape and position shown in Figs. 20, 39, and 40.

For the most efficient operation of my devices which separate the sheets individually from the pack and bend them outward therefrom it is preferable that the upper edges of the foremost sheets in the pack should rest but lightly against the clips 40; but when a pack of more than a moderate thickness is in the holder the portion of the pack above the top of the front of the holder tends, because of the aggregated weight of the sheets in that part of the pack, to press the foremost sheets with more force than is desirable against the clips. The force thus exerted, were it not for the obstruction offered by the clips against a forward movement of the sheets, would bend the top of the pack forward over the top of the front of the holder and in so doing would move the upper edges of the sheets in curves (shown in Fig. 40 by dotted lines $a$) about axis centers located approximately opposite the upper edge of the front, and each sheet would bend about an axis lying in the plane of that sheet. Because the plane in which the upper edges of the sheets in the pack lie is inclined upwardly and rearwardly, corresponding to the inclination of the bottom 19, the curve $a$ for each sheet rearwardly in the pack will be above the curve for any sheet more forwardly in the pack.

42, Figs. 20 and 39, is a heel or ridge extending across the pack, formed on the lower edge of a transverse strip, which may be the transverse bar 41. The heel 42 is arranged to touch the plane of the upper edges of the sheets in the pack or to pass slightly below that plane on a line somewhat in the rear of the clips 40. The effect of the heel 42 is to take the pressure of the sheets in the rear of the heel, as such sheets cannot bend forward beyond the heel, because the curve $a$ of each sheet in the rear of the heel is above the heel. The clips 40 are therefore relieved by the heel from the forward pressure of all sheets except those between the heel and the clips. The distance from the heel to the clips should be greater than the combined thickness of the sheets lying therebetween, so that these sheets will be free to separate themselves from the portion of the pack behind the heel. In Fig. 39 a gap in the pack is shown under the heel, caused by the falling forward of the sheets in front of the heel. As the foremost sheets are withdrawn from the pack the rearward sheets move forward down the inclined bottom 19 toward the front of the holder, the curve $a$ for each sheet also moving forward and dropping until it passes below the heel 42, whereupon the sheet is free to pass forward and in its turn reach the clips 40. In Figs. 40 and 41 the transverse strip is shown formed with two heels 42, which in some cases may be more effective than the single heel. The heel or heels 42 are cut away at intervals to allow the passage of the clips 40.

When a pack of sheets is supported on edge in the manner described, the planes in which the sheets in that portion of the pack which extends above the front of the holder lie will be coincident with or parallel to the plane of the extreme top of the front. When the plane of the top of the front of the holder and the planes in which the sheets that extend upward therefrom lie are arranged at an angle widely from the vertical, I have found that the portion of the pack above the top of the front tends to gravitate forward with such force as to bend or bulge the foremost sheets forwardly into the space above the edge of the front and sometimes to push the top edges of the foremost sheets out from under the heel 42 and clips 40. This action interferes with the operation of the sheet-withdrawing devices and is more manifest the greater the angle between a vertical plane and the plane of the top of the front; but when the planes of the top of the front and of that portion of the sheets in the pack which extends upward therefrom are nearly vertical I have found that the foremost sheets are not bent forwardly because gravity operates upon the sheets above the front nearly in the direction of their length and does not draw them forwardly with a force sufficient to bend them against the holding action of the clips 40. I have also found that packs of sheets having little vertical height or the upper portions of longer packs will stand readily when supported upon edge if they be leaned against a nearly-vertical front, but that packs of longer sheets will not stand well unless the lower part of the front lies at a considerable angle from the vertical. Hence for long sheets a front is required having its lower part arranged at an angle widely from the vertical for the proper support of the sheets, while the upper part of the front must be adapted to support the upper ends of the sheets in a nearly vertical plane in a position more favorable to the maintenance of the alinement of the sheets opposite the space above the top of the front than would be the case were the entire front continued to its top at the same angle as its lower part. The front which I have shown fulfils these requirements. Its lower portion is inclined at a wide angle from the vertical, while its upper part is curved gradually rearwardly until the angle of its extreme top approaches to the vertical plane. The bearings of the rollers 22 are so placed as to cause the faces of the rollers to form the curved front described. Packs of long sheets in the holder curve correspondingly to the curved front against which they lean.

The bottom 19 is provided at or near each end with adjustable guide-pieces 20 20, Fig. 21, adapted to slide along guideways 21 21, formed in or attached to the side frames 2 2$^a$ and preferably arranged parallel to the inclined lower part of the front of the holder.

23 23 are screws arranged one on each side of the machine, parallel to the guideways 21, and each is supported by a lower bearing 24 and an upper bearing 25, secured to the side frames 2 2$^a$. The screws 23 operate in threaded nuts or bosses 26, Figs. 7 and 21, secured to or forming part of the bottom 19, and when these screws are turned in unison the bottom 19 by the action of the screws in the nuts 26 is adjusted along the guideways 21.

The weight of the bottom 19 and of a pack of sheets thereon is supported through the medium of the nuts 26 by the screws 23, which may be secured against vertical displacement by any proper mechanical device, as by securing the lower ends 27, Fig. 7, of the screws each in a sleeve 28, having at its upper end a flange 30, adapted to engage the upper end of a bearing 24.

29 29, Figs. 4 and 7, are bevel-gears carried by the screws 23, and each may form part of a sleeve 28, as shown.

31 is a transverse shaft under the bottom 19 and supported by the side frames 2 2$^a$. On this shaft are secured bevel-gears 32, adapted to the bevel-gears 29. When the shaft 31 is turned, the screws 23, through the medium of the gears 29 32, are turned also.

To turn the shaft 31 a crank or equivalent device may be placed on the end thereof; but when, as shown, the shaft 31 is placed so low as to be out of convenient reach I place a crank 33, turning on a stud secured to the side frame 2, at a convenient height and secure the crank to a sprocket 34, connected by a chain 35 to a sprocket 36, fastened on the shaft 31. When the crank 33 is turned, then through the medium of sprockets 34 36, chain 35, gears 32 29, screws 23, and nuts 26 motion is communicated to the bottom 19 to adjust it to any desired vertical position.

37 is a raised edge strip or guard along the front edge of the bottom 19, against which the lower edges of the foremost sheets in the pack bear to prevent them from dropping into the space or crack between the front edge of the bottom and the front of the holder. The strip 37 is secured to the ends of bars 38, Figs. 12 and 13, adapted to slide in grooves 39, formed across the face of the bottom 19. The bars 38 fit loosely in their grooves and readily gravitate forward on the inclined bottom, so that the strip 37 will automatically maintain a position resting against the front of the holder.

When the bottom 19 is moved to its uppermost position, (see dotted lines, Fig. 1,) its front edge moves opposite to a portion of the curved part of the front of the holder, and in this position the space between the front and the foremost edge of the bottom is narrow, and the bars 38 are forced upward in their grooves by the pressure of the strip 37 against the front; but when the bottom 19 is lowered and its front edge moves opposite the lower straight part of the front the space between the front of the holder and the front edge of the bottom becomes wider. The bars 38 then slip down in their grooves to permit the strip 37 to maintain its contact with the front.

43 is a side guide carried by the bottom 19 near an end thereof. When my improved sheet-individualizing and edge-bending devices are arranged as shown, then, in order to aline the sheets for the proper action of those devices, a pack of sheets must be placed in the holder with the sheets on one side of the pack against the guides 43.

*The Sheet-Individualizing Mechanism.*

44 is a buckling-finger carrying the frictional pad 45, adapted to operate upon the foremost sheet in the pack. (See Figs. 44 to 53.)
46, Figs. 52 and 53, is a finger-holder provided with a dovetailed socket $46^a$, adapted to receive the beveled shank 47 of the finger 44 and also provided with a set-screw 48, adapted to operate diagonally against the upper side of the shank 47. The said holder is further provided with a stop-piece 49, Figs. 50, 51, and 53, underlying the shank 47 and adapted to hold the shank against the pressure of the screw 48. When the screw 48 is set against the shank 47, the finger 44 is rigidly held by the holder; but when the screw 48 is withdrawn until its end is out of line with the shank 47 the finger 44 may be removed to adjust or replace its pad 45 or to replace the finger and its pad by another finger and pad.

50 is a shoe to which the finger-holder 46 is pivoted, as by a pivot passing through ears 51, formed on the shoe, and through an extension 52 from the finger-holder. An ear 53, formed on the shoe 50, serves to brace the holder and prevent strain upon its pivotal connection with the shoe when the pad 45 is thrust against the face of the pack, as in Figs. 44 and 45. A spring 54 is adapted to press the holder 46 against the shoe 50. I have shown this spring connecting the outer ends of the holder 46 and the shoe 50 and tending to pull the holder and shoe toward one another.

The shoe 50 is pivoted at one end to an arm 55 of the rock-lever 56 and at its other end to a link 57, pivoted to an arm 58 of the rock-lever 59. The rock-levers 56 59 are each fulcrumed on a stud 60, carried by projections 61 61 from a plate 62, carried by the side frame $2^a$. The plate 62 may be placed in a depression $2^b$, formed in the side frame, Figs. 3 and 14. The rock-levers 56 59 are operated, respectively, by cams 63 64, having a constant rotation in the direction of the arrows in Figs. 44 to 47 and supported by bearings attached to the plate 62, and the rock-levers may be operated through the medium of antifriction-rollers 66 67, carried, respectively, by an arm 68 of the lever 56 and by an arm 69 of the lever 59. Springs 70 71 between an arm 72 of the lever 56 and an extension 73 of the arm 58 of the lever 59, respectively, and a stationary part tend to move the said rock-levers each against the action of its corresponding cam 63 or 64. The cam 63 controls those movements of the finger 44 which move it over the face of the pack and retract it therefrom, and the cam 64 controls those movements which bring the pad 45 against the foremost sheet and release it therefrom. The combined effect of the two cams is to give to the finger 44 and pad 45 the movements required to buckle a sheet. A projection 79, formed on the arm 58, may extend under the link 57 to give to it and to the parts carried by the outer end of it a more effective support than that provided by the pivotal connection of the link with the arm.

80 is a guard-plate adapted to press against the face of the pack adjacent to the buckling-finger and serves to bind the sheets against the action of the finger to insure the separation of but a single sheet from the pack with each stroke of the finger.

The buckling device described is located on that side of the machine on which is the side guide 43, and in such a vertical position that the pad 45 may operate on the sheets at about the point indicated in Fig. 16.

The normal position of the buckling-finger is that shown in Figs. 44 and 50. In Fig. 44 the cam 63 is shown in that position in which its depressed portion is just about to pass under the arm 68, and the cam 64 is shown with its depressed portion under the arm 69, in which position the roller 67 of the arm 69 is out of contact with the cam 64 by reason of the depth of the depression in this cam, which at this time extends below the roller 67, so that the spring 71 may exert its whole force through the medium of the lever 59, link 57, shoe 50, holder 46, and finger 44 to press the pad 45 against the pack.

In moving to the position shown in Fig. 45 the depressed portion of the cam 63 passes under the arm 68, thereby permitting the spring 70, through the medium of the lever 56, shoe 50, holder 46, and finger 44, to move the pad 45 inward, thereby causing the pad to act on the outermost sheet and draw its corner from under the guard-plate 80 and form a buckle in the sheet in the manner well known in this art. During this movement the depressed portion of the cam 64 continues under the arm 69 and the rock-lever 59 remains at rest, while the link 57 swings about its pivotal connection with the arm 58. The shape of the buckle (marked $d$) produced by this action is that shown in Fig. 16. The lower point of the buckle will be at that point on the side edge of the sheet that lies between the withdrawing-drum (marked 86) and the face of the pack of sheets, and it may lie, for instance, at $e$ in Fig. 16, and the outermost corner of the buckle will be at that clip 40 next adjacent to the buckling-finger where the slight effect produced by the buckling action at the distance of the clip from the buckling-finger is overcome by the holding action of the clip against the edge of the sheet. However, if the sheet be stiff the buckling action may cause the sheet to snap out from under that clip adjacent to the buckling-finger, in which event the outermost corner of the buckle will be at the clip second from the buckling-finger. As the buckling-finger moves forward its frictional pad will follow a path curved about the point $e$, Fig. 16, as a center, being drawn out of a straightforward course by its frictional hold upon the corner of the sheet, which corner operates as a tie to bind the pad to the point $e$. As the pad is drawn downward the buckling-finger and its holder 46 tilt on the pivot in the shoe 50 against the action of the spring 54 in a direction substantially at right angles to that of the forward movement of the buckling-finger, and at the instant that a buckle is completely formed in the sheet the buckling-finger and its holder and shoe may occupy the position shown in Fig. 51.

In moving to the position shown in Fig. 46 the cam 64 makes contact with and forces outward the arm 69 to the high part of the cam against the action of the spring 71 and through the medium of the lever 59, link 57, shoe 50, holder 46, and finger 44 moves the pad 45 away from the face of the pack. During this movement the depressed portion of the cam 63 continues under the arm 68, and the rock-lever 56 remains at rest, while the shoe 50 swings about its pivotal connection with the arm 55. As soon as the pad 45 is moved from the pack its frictional bind upon the foremost sheet is broken, and the spring 54 operates to return the finger-holder 46 and finger 44 to their normal positions. (Shown in Fig. 50.)

In moving to the position shown in Fig. 47 the cam 63 forces outward the arm 68 against the action of the spring 70 and through the medium of the lever 56, shoe 50, holder 46, and finger 44 moves the pad 45 to its outermost position. During this movement the high part of the cam 64 continues under the arm 69 and the rock-lever 59 remains at rest, while the link 57 swings about its pivotal connection with the arm 58, with the effect of holding the pad 45 away from the pack during its retractile stroke. As the cams move again into the position shown in Fig. 44 the depressed portion of the cam 64 passes under the arm 69, thereby permitting the spring 71, through the medium of the lever 59, link 57, shoe 50, holder 46, and finger 44, to return the pad 45 to its normal position.

The springs 70 71 may be attached to rods 74 75, passing loosely through a rib or projection 76 on the side frame $2^a$. By means of nuts 77 78, threaded, respectively, on the rods 74 75, the length of that part of each rod which extends from the rib 76 toward its corresponding spring may be varied to adjust the tension of the springs. The tension of the spring 70 is adjusted to give to that spring the force required to move the buckling-pad against the sheets to buckle them, and the tension of the spring 71 is adjusted to press the buckling-pad against the pack with the force required to give to the pad the proper frictional hold upon the sheets, and the tension of this spring will require to be adapted to the character of the sheets to be buckled, a strong tension being required to press the buckling-pad hard against thick and stiff sheets and a light tension being required to press the pad lightly against thin and flexible sheets.

81 is a shank forming part of or attached to and extending rearwardly from the guard-plate 80, and it may pass through and be guided in a groove formed in the bottom of the plate 62, as indicated by dotted lines in Fig. 48. A rod 82, attached to the rear end of the shank 81, passes loosely through the rib 76 and is operated on by a spring 83, which tends to draw the rod and the shank rearwardly to hold the guard-plate 80 with a uniform but yielding pressure against the pack. Nuts 84 on the rod 82 serve as a stop to limit the rear movement of the rod, and nuts 85 on the rod 82, against which the spring 83 acts, serve when they are moved along the rod to adjust the tension of the spring, and thereby, through the medium of the rod 82 and shank 81, to regulate the pressure of the guard-plate 80 against the face of the pack to adapt the pressure of the plate to the character of the sheets in the pack.

The Edge-Bending and Withdrawing Mechanism.

86 is the withdrawing drum or roller supported by the side frames 2 2ᵃ, located in front of the sheet-holder at a proper distance below the clips 40, with its surface adjacent to but not pressing against the pack of sheets and having a constant rotation in the direction of the arrow in Figs. 1 and 39.

87 88 are like rollers, each provided with journals 89, (see dotted lines, Figs. 22, 8, 9, and 10,) supported in bearings 90, adapted to slideways 91ᵃ, formed in heads 91, which are provided with journals 92, adapted to fixed bearings carried by the side frames 2 2ᵃ in such manner that the axis of rotation of the two heads 91 shall be coincident. Between each pair of bearings 90, carried by a head 91, is a spring 93, adapted to press the bearings apart, the outward movement of the bearings being limited by stops carried by the heads, and such stops may be provided with casings 94, surrounding the heads 91. When the heads 91 rotate, the rollers 87 88 will be moved in a cylindrical orbit or pathway about the common rotation axis of the heads 91. The rollers 87 88 act, in conjunction with the drum 86, to withdraw sheets from the pack, and for convenience of designation and in view of their peculiar motion I will call these rollers "orbital" rollers.

The orbital rollers are located above the drum 86, a short distance forward of the clips 40, in a position such that when the rollers are moved as described the outer edges of the rollers will move in a cylindrical orbit or pathway tangential or slightly secant to the periphery of the drum, whereby the rollers may make contact with the drum and exert a more or less forcible pressure thereon. The normal position of the orbital rollers is that shown in Figs. 1, 23, and 31, with a roller 87 or 88 in contact with the drum 86. As each sheet is bent about the drum 86 the heads 91 each make half a rotation, thereby causing the orbital rollers to move half-way about their orbital pathway in the direction of the arrow in Figs. 29 and 30, with the result of reversing the position of the rollers—for instance, so that the roller 88 will occupy the position in contact with the drum 86, as in Fig. 31, that was previously occupied by the roller 87, as in Fig. 23. Thus the sheets will be operated on by the orbital rollers, one sheet by one roller and the next sheet by the opposite roller, and so on alternately.

When an orbital roller is in contact with the drum 86, its bearings, by reason of the pressure of the roller upon the drum, are forced slightly inward in their slideways in the heads 91, thereby compressing the springs 93, which then operate to force the roller toward the drum with a yielding pressure, and because the same springs act on each orbital roller similarly the pressure of one roller will be the same as that of the other roller upon the drum. It will be understood that the pressure of the roller in contact with the drum is transmitted through the bearings of the opposite roller and the stop or casing 94 to the head 91 and thence to the fixed bearings which carry the heads. When an orbital roller is in contact with the withdrawing-drum, it will be caused by peripheral friction against the drum to turn in its bearings in the direction of the arrow in Figs. 23 and 39.

In Figs. 44 and 47 an end of an orbital roller and one of the heads which carry the orbital rollers are shown by full lines in the position which they occupy relatively to the buckling-finger 44 when the rollers are in their normal position, and in Fig. 44 the orbital rollers are shown by dotted lines in the position which they occupy at the instant that one of the rollers is passing opposite to the buckling-finger as the rollers swing over their orbital pathway.

I will now describe the device which I prefer to employ to cause the heads 91 to make the periodic semirevolutions described. (See Figs. 2, 22, and 32 to 38.)

Upon the outer end of each journal 92 is fixed a gear 95, which is driven by a gear 96, carried by a shaft 97, supported by the frame sides 2 2ᵃ. The shaft 97 may have its bearings through the hollow journals of the drum 96, as shown, Fig. 22. The ratio of the diameters of the gears 95 96 is such that the gear 95 will turn three times as fast as the gear 96. On one end of the shaft 97 is fixed a spider-disk 98, having across its face six equidistant radial grooves 99. A crank-arm 100, provided on its outer end with a pin 101 and located adjacent to the disk 98, has a uniform rotation in the direction of the arrow about any convenient support, as about a stud carried by the side frame 2. The pin 101 is adapted to engage the disk 98 by sliding in the radial grooves thereof, and it may so engage the disk through the medium of an antifriction-roller 102, Fig. 38, carried by the pin. The disk 98 is formed with a series of peripheral scallops 103, one scallop between each pair of grooves 99. A disk 104, adapted to fit peripherally into the scallops 103, is secured to the crank-arm 100, so as to turn with it. The disk 104 is partly cut away on that side adjacent to the crank-arm, as at 105, in such manner as to form points 106 107 on the disk equidistant from the radial line of the crank-arm—i. e., the straight line joining the center of the pin 101 to the center of rotation of the arm. The points 106 107 are each at such a distance from the said radial line of the crank-arm that when the arm is in a position with its radial line tangential to the periphery of the disk 98, as in Figs. 32 and 36, one of the said points will lie in or near a straight line passing through the centers of motion of the disk 98 and of the crank-arm 100. During a portion of each revolution of the crank-arm 100 its pin 101 engages a groove 99 and turns the disk 98 and, through the medium of the shaft 97, the gears 96 one-sixth of a rotation, and through the further medium of the gears 95 and the journals 92 turns the heads 91 in unison through one-half of a rotation.

In Fig. 32 the pin 101 is shown in the position which it would occupy at the instant of entering a groove 99; but the disk 98 as yet remains at rest. The point 106 of the disk 104 is now on the line between the centers of the disks 98 and 104. In this figure the orbital roller 87 is indicated by dotted lines as in contact with the drum 86.

In Fig. 33 the pin 100 is shown advanced partly into a groove 99, having by its engagement with the side wall of the groove turned the disk 98 somewhat in the direction indicated by the arrow, and the point 106 of the disk 104 is shown somewhat advanced, so that the cut-away place 105 is about to span over the end of a groove 99.

In Fig. 34 the pin 101 is shown advanced to its lowest point in a groove 99, having turned the disk 98 in the direction of the arrow through one-twelfth of a rotation, and the point 106 of the disk 104 is shown still further advanced, so that the cut-away place 105 is now opposite the end of a groove 99, thereby permitting a prominent part of the periphery of the disk 98 to pass through the cut-away place 105 without interfering with the disk 104. In this figure the orbital rollers 87 88 are shown by dotted lines in the position which they will occupy at the instant that they have completed one-half of the movement by which their positions are reversed.

In Fig. 35 the pin 101 is shown advanced partly outward in a groove 99, having turned the disk 98 still further in the direction of the arrow, and the point 107 of the disk 104 is shown passing into a scallop 103, the cut-away place 105 having cleared a prominent part of the disk 98 at the end of a groove 99.

In Fig. 36 the pin 101 is shown in the position which it occupies at the instant of passing out of a groove 99. The disk 98 has now come to a position of rest and the point 107 of the disk 104 has at this instant just made contact with the disk 98, while a portion of the disk 104 is now coincident with the surface of a scallop 103. In this figure the orbital roller 88 is indicated by dotted lines as in contact with the drum 86, and the roller 87, which was formerly in contact with the drum, is shown farthest away from the drum. The disk 98 and the parts operated thereby now remain at rest until the crank-arm 100 again reaches the position shown in Fig. 32, when the movements described are repeated. As the pin 101 turns away from the position shown in Fig. 36 the disk 104 passes fully into the scallop 103, as shown in Fig. 37, and forms a lock to prevent the accidental turning of the disk 98 in either direction.

If preferred, the disk 98 may have more or less than six radial grooves. If it have more grooves than six, the crank-arm 100 must be shorter and the gears 95 must be smaller in proportion to the gear 96 than shown. If it have fewer grooves than six, the crank-arm 100 must be longer and the gear 95 must be larger in proportion to the gear 96 than shown. When properly proportioned, the effect of the device in turning the heads 91 by intermittent semirotations will be the same whatever may be the number of grooves in the disk 98.

108, 109, &c., are a series of fingers located above the withdrawing-drum 86 and adapted to move vertically in a plane parallel to and slightly in front of the upper end of the foremost face of the pack. The extent of the vertical movements of the fingers may be from the position occupied by finger 108 to that occupied by finger 109 in Fig. 39. The lower ends or points of the fingers are rounded, so that they will not cut or pierce the sheets which they operate upon, and the points may be broadened by a forwardly-projecting toe 110 and may be provided rearwardly with a rounded heel 111, Figs. 40 and 41.

Any suitable device may be employed to give the vertical movements to the fingers 108 109; but I will describe the devices which I have shown for this purpose. The fingers 108 109 are pivoted individually near their upper ends to a series of arms 112, fulcrumed upon a fixed fulcrum-bar 113. Another series of arms 114 below the arms 112 are fulcrumed on a fixed bar 115. The arms 112 114 are connected by links 116. A series of cams 117, carried by a shaft 118, supported by the frame-sides 2 2ª, operate the arms 114, and may so operate them through the medium of antifriction-rollers 119, carried by the arms. A bar 121, which may be provided with recesses 120 for the fingers to move in, extends transversely below the shaft 118 and serves to guide the fingers in their vertical movements, Figs. 19, 39, 40, and 43. Springs 122 between the arms 112 of the fingers 108 109 and a part stationary as to the vertical movements of the fingers tend to move the arms 114 against the action of the cams 117. I have shown the springs 122 connected at their upper ends to projections 123, extending upwardly and rearwardly from the pivotal connection of the finger with the arms 112, and I have shown their lower ends connected to loops 124, secured to the bar 121, as in Figs. 39 and 42, or, if preferred, the lower ends of the springs may be connected to pins 124, fastened in the cross-brace 6, as in Fig. 40. When thus arranged, the springs, in addition to the function already assigned to them, tend, by drawing upon the projections 123, to tilt the fingers upon their pivotal connection to the arms 112, thereby pressing that portion of the fingers below the arms 112 forwardly against the bar 121 or other front support, so as to prevent the points of the fingers from pressing against the pack during their vertical movements. A group consisting of a finger 108 or 109, a bar 112, a bar 114, a link 116, a cam 117, and a spring 122 operates independently of the operation of any any other similar group. When the elevated portion of a cam 117 passes under a bar 114, it oscillates that arm and thereby, through the medium of a link 116 and a bar 112, lifts upward the corresponding finger 108 or 109 against the action of a spring 122, and when the depressed portion of a cam 117 passes under the arm 114 the spring 122 operates to pull downward the finger 108 or 109 and to depress the arms 112 114 and link 116. The cams 117 are of the proper shape to give to the fingers the movements hereinafter ascribed to them. An adjustable stop 125 is carried in the outer end of each arm 112 and is adapted, by striking a portion of an arm 114, to limit the descent of the arm 112 and attached finger. By adjusting the stops 125 the position of the fingers when at the end of their inward movements may be regulated.

When it is not necessary to have all of the fingers 109 in operation, any finger or fingers not required for use—as, for instance, a finger or fingers not opposite a pack of sheets, as the fingers to the left of the dotted line $f$ when sheets were being operated upon having a width of from $f$ to $g$ in Fig. 19—may be put out of action by retaining it or them with its or their point or points above the position to which it or they normally rise. In Figs. 40 and 41 I have shown a means for thus retaining a finger. A pocket 126 is formed in the face of the bar 41 opposite each finger and above the line of the clips 40. A finger is lifted and its point inserted in a pocket, where it remains out of operation until it is lifted out of the pocket. When a finger 109 is held in a pocket 126, it is lifted so high that through the medium of its arm 112 and link 116 its arm 114 is raised out of reach of the cam 117.

The bar 121 is attached to pendants 127, which swing on stud-pins 128, secured to the side frames 2 2ᵃ. Cams 129, carried by the shaft 118, one near each side of the machine, operate on the pendants 127 to swing them and the attached bar 121 about the pins 128, and the cams may so operate on the pendants through the medium of antifriction-rollers 130, carried by the pendants. The bar 121 and pendants 127 move by gravity against the action of the cams 129; but such movement is made more quick and positive by the tension of the springs 122, which press the fingers 109 forwardly against the bar, as previously stated, and thereby operate to press the bar forwardly and move the pendants against the cams. When the lower part of the cams 129 are turned toward the pendants, the springs 122 force the fingers 109 and the bar 121 forward into the position shown in Fig. 39; but when the high part of the cams 129 are turned toward the pendants they and the bar 121 and fingers 109 are forced rearwardly by the cams against the action of the springs 122 to the position shown in Fig. 40. All of the fingers 109 are operated on by the bar 121; but the finger 108 in the construction shown is not influenced by the oscillatory movements of this bar, for a reason hereinafter set forth. A clip 131, attached to the bar 41, passes in front of and takes the forward pressure of the finger 108. The recess 120 in the bar 121, which guides this finger, is cut so deeply into the bar that the bar will not touch the finger when it swings forward. In Fig. 43 two recesses 120 are shown, the shallower one being adapted to a finger 109 and the deep-cut one to the finger 108.

132 are adjustable stop-fingers adapted by engaging the bar 121 to adjust the limit of the outward movement of the bar and of the fingers 109 irrespective of the position of the cams 129 or the depth of their depressed portions. These fingers may be secured to the cross-brace 6 and may be adjusted by screws 133 between the stop-fingers and the brace.

134 135 are assistant withdrawing-rollers located in front of the drum 86 and of the rollers 87 88 and are supported by the side frames 2 2ᵃ and spring-pressed in the usual manner to maintain a yielding contact between them, and these rollers rotate constantly in the direction of the arrows in Fig. 1.

The surfaces of the drum 86 and of the rollers 87 88 134 135 are covered with proper material to make frictional contact with the sheets, and the rotation of the drum 86 and of the rollers 134 135 is so regulated that the surface speed of the drum and of these rollers will be the same.

After the sheets have passed from the withdrawing devices they may be received upon a conveyer, which I have shown as an endless apron 136, passing about rollers 137, 138, 139, 140, 141, 142, and 143, supported by the side pieces 12 12ᵃ. The sheets are held upon the conveyer by cords 144, passing about rollers 145, 146, 147, 148, and 149, supported by the side frames 12 12ᵃ.

I will now explain the operation of withdrawing sheets, which may be understood by a consideration of successive positions of parts, as shown in Figs. 23 to 31.

A pack of sheets is placed in the holder with the edges of the sheets on one side against the side guide 43, Fig. 1, and the bottom of the holder is adjusted to the proper height to bring the top front edge of the pack opposite the clips 40. Suppose parts to be in the position shown in Fig. 23, with the roller 87 in contact with the drum 86 and with the finger 108 in its highest but the fingers 109 in their lowest positions, the process of withdrawing sheets may be commenced. At this instant the buckling-finger 44 will occupy its normal position, (shown in Fig. 44,) being just on the point of commencing its inward or buckling stroke.

Fig. 24 shows the position of parts at the instant that the finger 108 is on the point of commencing its downward and the fingers 109 are on the point of commencing their upward strokes. At this instant the buckling-finger has about half completed its inward stroke and has partly formed a buckle d in the outermost sheet in the pack.

Fig. 25 shows the position of parts at the instant that the buckling-finger has reached the position shown in Fig. 45, having just completed its instroke and fully formed a buckle d. The finger 108 has dropped somewhat and its point is commencing to pass behind the buckle d. The fingers 109 have nearly reached the termination of their upstroke. Fig. 16 shows this position of the parts in front view.

Fig. 26 shows the position of parts at the instant that the buckling-finger has reached the position shown in Fig. 46, having just raised its pad 45 away from the pack. Finger 108 has passed farther downward and its point has passed completely behind the buckle. Fingers 109 have just reached the termination of their upstroke.

Fig. 27 shows the position of parts at the instant that the finger 108 has made about two-thirds of its downstroke and the buckling-finger has made about one-third of its retractile stroke. Fig. 17 shows this position of the parts in front view. The finger 108 has now passed so far down behind the buckled sheet that its toe 110 has begun to press or bend the sheet outward, so that its edge has snapped out from under one of the clips 40, Fig. 17, or it may have snapped out from under more clips than one, according to the stiffness of the sheet. That finger 109 next to the finger 108 has dropped slightly, but all other fingers 109 remain in their uppermost positions. The "snapping" of the edge of a sheet from under a clip 40 is accomplished partly by a slight kinkling or giving away of the sheet behind the clip and partly by a bending upward of the clip, which is made delicately pliable for that purpose. As soon as a sheet has passed from under a clip the clip springs back to hold the underlying sheets.

Fig. 28 shows the position of parts at the instant that the finger 108 has fully completed its downward stroke. At this instant the buckling-finger 44 has reached the position shown in Fig. 47, having just completed its retractile stroke. Fig. 18 shows this position of the parts in front view. The corner h of the foremost sheet is now fully bent or pressed outward opposite the finger 108 by the action of that finger. As the corner is bent outward it bends around and slips out from under the raised pad 45 while that pad is making its return stroke, so that the pad is now at liberty to drop back against the face of the pack. After that finger 109 first from the finger 108 has commenced its downstroke each other finger 109 commences to move downward successively in order from the first finger 109, with brief intervals between the starting of one and the starting of the next finger. As the first finger 109 moves downward from the position shown in Figs. 17 and 27 it passes behind the corner of the sheet outheld by the toe 110 of the finger 108 and its toe 110 presses or bends the edge of the sheet still farther outward, and in so doing causes the edge to snap from under the second clip 40. Then the second finger 109 starts downward and passes behind the edge of the sheet outheld by the toe of the first finger 109 and by the finger 108 and in turn pushes or bends the edge of the sheet forward from under the third clip 40, and so on for each successive finger. Each finger operates to snap the sheet from under the clip next in order beyond the finger, so as to make a space between the edge of the sheet and the pack for the entrance behind the sheet of the next finger 109 before that finger moves downward to the edge of the pack. However, if the sheet be somewhat stiff it may snap out from under two or more clips in advance of the successively last finger 109 that passes behind the sheet instead of from under but one clip in advance of such finger, as described.

In Figs. 18 and 28 all of the fingers 109 have started downward except the last one, and in Fig. 18 the edge of the sheet is shown snapped out from under all of the clips except the last three. I have found in practice that usually a sheet, even if it be not stiff, will snap out from under all of the clips by or before the time that the fingers have reached the position of Fig. 18, because a sheet is more easily slipped from under the clips the greater the distance of the clips from the point of buckling the sheet. This will be understood when it is considered that the apex of the bend in the sheet is always at the point e and that the line of bending more and more approaches the horizontal as the end of the bend recedes from the corner first buckled. This is indicated by shaded lines in Figs. 16, 17, and 18. To facilitate the bending of the sheets at the side next to the buckling device, I prefer to place the fingers 108 109 closely together on that side and then gradually to increase the distance between those fingers that are farther across the pack from the buckle.

Fig. 29 shows the position of parts at the instant that the orbital rollers have made about one-fifth of one of their intermittent movements. The buckling-finger has now dropped back to its normal position, with its pad against the pack, there to remain until the time comes for it to buckle another sheet. The finger 108 remains in its lowermost position and the fingers 109 have all nearly completed their downward movement. As the uppermost roller 88 moves over toward the pack the fingers push the edge h of the foremost sheet under the roller.

Fig. 30 shows the position of the parts at the instant that the roller 88 as it moves forward in its orbital pathway makes contact with the edge of the sheet. The finger 108 remains in its lowermost position, the fingers 109 have all completed their downward movement, and the edge h of the foremost sheet is fully bent outward from the pack. Fig. 19 shows this position of the parts in front view.

Fig. 31 shows the position of parts at the instant that the roller 88 completes its orbital movement and makes contact with the drum 86. At this instant the finger 108 is on the point of commencing its upward movement and the fingers 109 have just completed one of their rearward oscillations, which they all make simultaneously under the action of the swinging bar 121, thereby forcing their heels 111 hard against the pack and clamping those sheets adjacent to the sheet now to be withdrawn. The roller 88 as it moves to the position Fig. 31, by pressing upon the edge h of the foremost sheet, bends that edge about the drum 86, whereby when the roller contacts with the drum the edge of the sheet will lie between the roller and drum.

During the interval in which the parts move from the position Fig. 31 again to the position Fig. 23 the fingers 109 continue to clamp the pack, the finger 108 rises to its uppermost position, and the foremost sheet is partially withdrawn from the pack by the frictional action upon the sheet caused by the roller 88 pressing the sheet against the moving surface of the drum 86. In Fig. 23 the foremost edge h of the sheet is shown somewhat advanced from the pack and just about to pass between the rollers 134 135. When the foremost sheet first commences to move forward from the pack, it sometimes tends, by reason of its frictional adherence to the subjacent sheet or sheets, to draw forward one or more sheets besides itself. Were the finger 109 in the position shown in Fig. 39 when the said subjacent sheet or sheets were drawn up they would, after first coming into contact with the lower end of the transverse bar 41, buckle forward above the drum 86 and behind the fingers 109, and thereby prevent the successful separation of a sheet from the pack by the next downward stroke of the fingers. The clamping action of the fingers 109 upon the said subjacent sheets effectually prevents any of them from being drawn outward with the foremost sheet. I have found that the clamping is only required at the instant that the foremost sheet commences to move from the pack, for if the foremost sheet has commenced at all to move without moving a subjacent sheet its frictional hold upon that sheet becomes broken, so that the further withdrawal of the foremost sheet may be continued without danger of moving a subjacent sheet, even though the clamp be then removed from the pack.

As the parts continue in operation from the position last referred to in Fig. 23 the withdrawal of the sheet from the pack is continued by the conjoint action of the roller 87, drum 86, and the rollers 134 135. By the time that the orbital rollers again commence one of their orbital movements, if the sheets in the pack be short, a sheet will have been completely withdrawn; but if, as is usually the case, a portion of the sheet yet remains in the pack such sheet will during the orbital movement of the orbital rollers continue to be withdrawn by the action of the rollers 134 135 and of the drum 86 only. The special purpose of the rollers 134 135 is to make the withdrawal of the sheets continuous by drawing on them when an orbital roller is not in contact with the drum 86. By the time the parts have reached the position Fig. 24 after the position last referred to in Fig. 23 the fingers 109 will have been released from clamping the pack by the forward swinging of the bar 121 and the buckling-finger will have commenced to form a buckle d in a second sheet, which by a repetition of the movements described will in its turn be buckled, bent forward, and withdrawn. By the continued operation of the mechanism in the manner described a series of sheets will be successively individualized and withdrawn from the pack.

By the action described one sheet is separated from the pack with each vertical reciprocation of the finger 108 109, and corresponding orbital movement of the orbital rollers and the withdrawal of each sheet may be commenced before the sheet previously operated on has been completely withdrawn. When this is done, the forward edge of each succeeding sheet is bent over the preceding sheet which yet lies against the withdrawing-drum, and the two sheets are thereafter simultaneously withdrawn from the pack. If the sheets are very long or the speed of the withdrawing-rollers slow, more than two sheets may thus be in process of withdrawal at one time.

While I prefer to use the rollers 134 135 to cause the continuous movement of the sheets from the pack, these rollers may be omitted and each sheet may be withdrawn by successive contacts of the orbital rollers with the withdrawing-drum, or when the surface speed of the drum relatively to the period of contact of an orbital roller with the drum is so adjusted that a surface length of the drum not less than the length of the sheets in the pack will pass the orbital roller while the roller and drum remain in contact a sheet may be completely withdrawn from the pack by each contact of an orbital roller with the drum without the aid of the rollers 134 135. When the rollers 134 135 are not employed, the rollers 139 146 of the conveyer may occupy the position relatively to the withdrawing-drum and orbital rollers in which they are shown in Fig. 39.

Instead of making the bearings of the orbital rollers spring-pressed in the heads 91 91 it is obvious that the bearings of the rollers may be fixed in the heads which carry them, and the bearings of the journals 92 of the heads 91 may be made spring-pressed with the same effect of obtaining a yielding pressure between an orbital roller and the withdrawing-drum.

I have stated that the finger 108 is not affected by the oscillatory movement of the clamping-bar 121 and that a fixed clip 131 is provided to support this finger. This arrangement is for the purpose of permitting the finger 108 to rise to its uppermost position while the fingers 109 are still in their lowermost position engaged in the act of clamping the pack, whereby the finger 108 may start on its downward movement while the fingers 109 are making their upward movement. Thus an instant of time is saved in the cycle of the movement of the parts and sheets are separated from the pack successively quicker than if the finger 108 had not made its upward stroke until the fingers 109 make their upstrokes. However, if preferred, and in machines for feeding very narrow sheets only this is necessary: The clip 131 may be dispensed with and the finger 108 may be placed under the action of the clamping-bar and may operate to clamp the pack the same as the fingers 109 are shown to do.

While I prefer as a safeguard against the occasional drawing up by the action of the withdrawing device of more than one sheet at a time to employ the device for forcing the fingers 109 against the pack to clamp the foremost sheets, yet this feature of my machine may be omitted in machines designed to operate only upon sheets of a somewhat firm and rigid texture and of small dimensions. In packs of such sheets any tendency to draw up a subjacent sheet by the withdrawal of the outermost sheet is checked by the abutting of the end of the subjacent sheet against the under side of the transverse bar 41, which stops the sheet from further upward movement, while the natural stiffness of the sheet prevents it from buckling forward under the small force created by the adherence of the outermost sheet to it.

Instead of employing the two rollers 87 88 one of these rollers may be omitted and but one roller may be employed, and this roller may be moved completely around its cylindrical pathway with each sheet that is bent outward from the pack instead of but halfway around it, as described, and such a movement would be produced by changing the ratio of the diameters of the gears 96 95, so as to be six to one instead of three to one, as stated.

The Pack-Pressers.

150 150, Figs. 1 and 21, are bottom pressers, which may in some cases be employed to press upon the back of the pack along its lower edge to force the lower edges of the sheets forward over the inclined bottom as the pack becomes thinner by the withdrawal of sheets from its front face.

151 152, Figs. 1 and 5, are top pressers arranged in a series transversely across the sheet-holder, adapted to rest against the rear or back of a pack of sheets along its upper edge and serving to hold the upper parts of the sheets against the pressure of the buckling and pack-clamping fingers, and when there are few sheets in the pack are particularly required to prevent the upper edge of the sheets from bending backward away from the pressure of these fingers. The function and operation of these pressers are similar to that of the similar pressers shown in Letters Patent to me No. 540,814, dated June 11, 1895. (See specification to that patent, page 3, lines 12 and 13, lines 19 to 24, and lines 104 to 113, and page 4, lines 21 to 52.) The improvements in this part of my present machine relate to the manner in which the top pressers are arranged and supported and to the means by which the pressers are lifted out of and replaced behind the pack.

Were the packs of sheets in the holder always of one width, but one top presser would be required, and it might reach across the entire width of the pack; but when the machine is to feed from packs of varying widths I prefer to employ several top pressers arranged at intervals and to have the presser marked 151 on that side of the machine toward the buckling device of about the width of the narrowest pack of sheets to be placed in the holder and to have one other presser (marked 152) opposite each finger 109 that is located beyond the presser 151. In the drawings I have shown the presser 151 wide enough to extend opposite the buckling-finger, the finger 108, and three fingers 109, Fig. 5.

153 154 are forward and rear antifriction-rollers carried, respectively, the rollers 153 by rods 155 and the rollers 154 by rods 156, and these rods are secured to brackets 157, attached to and extending upwardly and rearwardly from the pressers 151 152. The rollers 153 154 are adapted to run in grooves formed in guide-rails 158, which are secured at or near their ends to forward and rear transverse bars 159 160. The rails 158 and bars 159 160 form one construction, which I will call a "cradle." The rails 158 when in their normal position are inclined upwardly and rearwardly and are arranged parallel to the slant of the top of a pack of sheets when in the holder. The rails 158 are shown in their normal position in Figs. 1 and 5 in the left-hand side of Fig. 4 and by full lines in Fig. 39. The brackets 157 are slanted rearwardly, so as to allow the pressers to pass under the cross-bar 6 and clips 40 to the position shown by dotted lines 151$^a$ in Fig. 1. Each presser is provided with one rod 155, with a roller 153 on each end of it, and with one rod 156, with a roller 154 on each end, and each presser is supported and guided independently of each other presser. Each guide-rail 158, except the ones adjacent to each side of the machine, may be formed with a trackway on each side of it, one trackway for the antifrictional rollers on one side of one presser and the other trackway for the antifrictional rollers on one side of an adjacent presser. (See Figs. 4 and 5.) When a presser is in the act of pressing against a pack, its rollers 153 bear against lower and its rollers 154 bear against upper ribs 161, which form the grooves or trackways in the rails 158, in which the rollers run, and the presser is thus prevented from swinging rearwardly. When the pressers are in their extreme forward position with no sheets in front of them, their lower points rest against the upper edge of the front, as against a top roller 22, while the upper ends of the pressers rest against the closed lower ends of the guide-rails 158, which serve as stops against the rollers 153. (See 151$^a$, Fig. 1.) The pressers are thus restrained from pressing upon the withdrawing-drum 86. In Fig. 39 a top presser is shown pressing upon a thin pack of sheets, and in Fig. 1 a presser is shown by full lines in the position which it would occupy if behind a thick pack of sheets.

The presser 151 must manifestly be always in use, but the pressers 152, or some of them, may at times be placed out of action. It is usual to put out of action any presser which may lie opposite a finger 159 that has been placed out of action. A presser may be put out of action either by removing it entirely from the cradle, or it may be turned up so as to rest upon the top of the cradle. A portion of the lower line of ribbing 161 near the rear end of each guide-rail 158 is removed, thereby forming openings 162, Figs. 1 and 39, downward through the bottom of each trackway. A portion of the upper line of ribbing 161 of each guide-rail 158 is widened out at 163, Figs. 1, 5, and 39, and a portion of each widened-out part is carried upward to form a peak 164, extending above the top of the guide-rail. The width of the face of a top presser is less than the distance between ribs 161, but greater than the distance between the widened ribs 163 of guide-rails 158 adjacent to each side of the presser. When a presser is in the position shown by full lines in Fig. 1, it is evident that by swinging the presser toward the right about its rollers 153 as a pivot its rollers 154 will pass downward through the openings 162 and below the trackways of the pressers. The rollers 153 may then be passed downward through the same openings, and the presser may then be removed, or it may be turned upon the top of the cradle in the following manner: The point of the presser is placed over the peaks 164 of adjacent guide-rails, as shown by dotted lines 151$^b$ in Fig. 39. Then by moving the presser forward over the peaks 164 its rollers 153 may be returned through the openings 162 and may be placed in the pockets forming the rearmost ends of the trackways between the ribs 161. The point of the presser will then drop in the rear of the peaks 164 and rest upon the widened portion 163 of adjacent rails 158 in the position shown by dotted lines 151$^c$ in Fig. 1, where it will be securely held until required for use, when movements the reverse of those described will place the presser in operative position. In Fig. 5 a presser 152 is shown in top view in the same position as that indicated by dotted lines 151$^c$ in Fig. 1.

The transverse bar 160 of the cradle is pivoted to arms 165, secured to a rock-shaft 166, supported by bearings carried by the side frames 2 2$^a$. The ends of the bar 159 of the cradle are adapted to move over guide-tracks 167, carried by the side frames 2 2$^a$. The bar 159 is preferably guided over its guide-tracks through the medium of antifriction-rollers 168, carried by the ends of the bar. When the shaft 166 and arms 165 are rocked in the direction of the arrow in Fig. 39 to the position shown by dotted lines 165$^a$, the arms, through their pivotal connection to the bar 160, rock the rear end of the cradle rearwardly, the forward end of the cradle being guided by the dragging of the bar 159 over the guide-tracks 167. The tracks 167 are so shaped that when the bar 159 is dragged over them the forward end of the guide-rails 158 will be lifted and caused to pass over the course indicated by the dotted line $l$, Fig. 39, until the rails reach the position shown by dotted lines 158$^a$ in Fig. 39 and by full lines 158 in Fig. 3. The closed ends of the guide-tracks 167 serve as stops against the ends of the bar 159 to limit the lower and upper positions of the rails 158. Suppose the top pressers to be in their most forward position, 151$^a$, Fig. 1. Their lower points would be at $m$, Fig. 39.

As the rails 158 and the pressers carried thereby are lifted the points of the pressers move first rearwardly, corresponding to the rearward trend of the lower end of the course $l$ to the point $n$, thereby attaining a sufficiently rearward position to clear the cross-brace 6. Thence the points of the pressers sweep upwardly over the course indicated by the dotted line $o$ to the point $p$, when the pressers will be in the position indicated by dotted lines 151$^d$. Should the top pressers be resting against a pack—as, for instance, in the position shown by full lines in Fig. 39— at the instant that the guide-rails 158 are lifted, then the points of the pressers, in rising, drag on the rear surface to the top of the pack, and then the presser being no longer outheld by the pack will slide forward to the ends of the rails 158, thereby bringing their lower points on the line $o$. Thence the points of the pressers will follow the curve of the line $o$ to the point $p$. When in the position 158$^a$, the rails 158 are inclined downwardly toward their rear ends, and the pressers, after they have reached the position 151$^d$, will slide in their now rearwardly-inclined trackways to the rear end of the guide-rails 158, whereupon the rollers 153 of the pressers fall into pockets or depressions 169 in the lower courses of the ribbing 161 of the rails 158. The pressers now occupy the position shown by dotted lines 151ᵉ in Fig. 39 and by full lines 151 in Fig. 3, and in moving to this position the points of the pressers move over the course indicated by the dotted line $q$ to the point $r$, Fig. 39. When the arms 165 are rocked in a direction the reverse of that indicated by the arrow in Fig. 39, the guide-rails 158 are returned to their normal positions, whereupon the top pressers slide down their now forwardly-inclined trackways and rest against the rear of that pack which may then be in the holder. The pockets 169 are cut at such an angle as not to permit the top pressers to gravitate out of the pockets into the incline of the trackways until the rails 158 have nearly reached their normal positions, and this insures a nearly complete dip of the points of the pressers in the rear of the pack before they commence their forward slide. The points of the pressers in their return movement from the point $r$ follow nearly the course indicated by the dotted line $s$, Fig. 39. If the top pressers do not escape out of the pockets 169 until the rails 158 reach their normal position, the pressers at the instant that the position of the rails become normal will occupy the position shown by dotted lines 151ᶠ, Fig. 39.

170 is a handle fixed on and adapted to rock the shaft 166. The normal position of this handle is that shown by dotted lines 170ᵃ in Fig. 2 and is the position which the handle will occupy when the rails 158 are in their normal position. When the handle is moved from its normal position to the position indicated by dotted lines 170ᵇ, Fig. 2, and by full lines 170 in Fig. 3, the shaft 166 is rocked in the direction of the arrow in Fig. 39. By the return of the handle 170 to its normal position the shaft 166 is rocked in a direction the reverse of that indicated by the arrow in Fig. 39.

The handle 170 may be fixed on a rod 171, carried by and adapted to slide in bosses 172, carried by a shoe 173 on an end of the shaft 166. The rod 171 is bent at 174, Figs. 4, 5, and 11, and its bent end passes through and projects beyond a slot 175 in an end of the shoe 173. A latch 176, provided with a side projection 177, is pivoted to a projection from the side frame 2 and is adapted to engage the projecting bent end 174 of the rod 171. As the handle 170 is moved from its normal position to the position indicated by full lines in Fig. 2 the bent end 174 engages the under side of the projection 177 of the latch 176 and lifts and passes under the latch, after which the latch drops behind the bent end and locks it and the handle 170 against a return movement to their normal position. When the handle is in the position 170, Fig. 2, the rails 158 will occupy a horizontal position, (indicated by the dotted line 158ᵇ in Fig. 39 and by full lines 158 in Fig. 2 and in the right-hand side of Fig. 4.) The line 158ᵇ, Fig. 39, represents the center line of the rails 158, which are not shown in this position in complete outline, and the top pressers may occupy the position indicated by dotted lines 151ᵍ, Fig. 39, in which position they will remain, because the trackways which sustain them are horizontal, and in that position they will be entirely above the pack of sheets and access to the rear of the machine may be had without interference from the pressers. When in the horizontal position described, the weight of the rails 158 and of the pressers thereon tends to push the bar 159 down on its tracks 167; but this tendency is restrained by the latch 176 through the medium of the rod 171, shoe 173, shaft 166, arms 165, and bar 160, and the rails 158 will be maintained in their horizontal position. When the guide-rails 158 are to be returned to their normal position, the handle 170 is pushed slightly upward and its rod 171 slides through the bosses 172 and lifts the bent end 174 in the slot 175 to permit the bent end to pass over the side projection 177 of the latch 176 on the return movement of the handle.

The handle 170 is moved by the operator when it is required to give to the rails 158 the movements described. When sheets have been placed in the pack overlying the pressers and it is required to lift the pressers and to return them in the rear of the pack, the rails 158 are raised to their uppermost position. If an empty sheet-holder is to be supplied with sheets, the rails 158 must be locked in their horizontal position while sheets are placed in the holder underneath the pressers, because the pressers when in an extreme forward position cannot be withdrawn after sheets have been placed in the rear of and overlying them, owing to the rearward movement of the pressers when in that position required to get them out from under the cross-brace 6. When the rails are no longer required to rest in their horizontal position, they are lifted to their extreme top position to allow the pressers to move to the rear of the pack.

*The Registering Mechanism.*

The sheet-registering mechanism now to be described is designed to operate on sheets while they are in motion upon the conveyer. It operates to draw the sheets sidewise against a side gage without stopping the sheets from their forward movement, and is specially designed to be used in feeding ruling and other machines which do not require a front or spacing registry for the sheets. It consists, primarily, of a side gage 178, Fig. 6, having its registering edge parallel to the course of the conveyer, and a frictional rotatable disk 179, arranged above the conveyer and adjacent to the side gage, with its lower edge adapted to press lightly upon the conveyer and having its face set diagonally to the course of the conveyer, with that edge of the disk which is most advanced in the direction toward which the sheets proceed closer to the registering edge of the side gage than the opposite edge of the disk, Figs. 6 and 56.

Suppose a sheet to be passing on the traveling surface of the conveyer with one of its side edges toward the side gage and somewhat removed therefrom, but yet not so far removed but that the edge will pass under the disk 179. As soon as the sheet passes under the disk the disk tends to draw the sheet in a direct line with its face, but in a diagonal direction as to the course of the conveyer, and will so draw the sheet, with the result of causing the sheet to slip over the moving conveyer, on which it lightly lies, until it reaches the side gage, whereafter the sheet will be carried along parallel to the side gage, while the disk, no longer able to move the sheet, will slip along its surface parallel to its edge.

If sheets be diagonally disposed on the conveyer before reaching the disk, the disk operates to straighten such sheet by bringing its side edge against the side gage. Thus by the operation of the disk a series of sheets in passing over the conveyer may be straightened as to their edges and be brought all to the same line of alinement.

Although the disk will work well in many instances when permitted to rotate loosely upon its axis without being power-driven, yet I prefer to power-rotate the disk at about the same surface speed as the surface speed of the conveyer, as such power-rotation prevents a certain dragging action which the disk has upon the sheets when the friction of the sheets in passing under the disk is depended upon to give motion to the disk.

When long and wide sheets are to be registered, I prefer to employ two registering-disks 179 180, placed some distance apart in the direction of the course of the conveyer. The action of the disk 180 upon the sheets is similar to that of the disk 179, already described.

More than two disks may be employed in registering the sheets, if desired.

I will now describe the detailed construction of the registering device, referring more particularly to Figs. 54 to 61.

A transverse pocket is formed in the surface of the sheet-conveyer at a proper distance from the ends thereof by bending the apron 136 about the rollers 140 141 142. In this pocket is located the transverse shaft 181, supported by the side pieces 12 12ª, with its upper side in line with the surface of the conveyer. The shaft 181 has a uniform rotation in the direction of the arrow in Fig. 54, with a surface speed preferably equal to that of the conveying-apron. The sheets carried forward by the apron 136 are carried over the said pocket and the shaft therein to that part of the apron beyond the pocket and thence to the end of the conveyer.

The side gage 178 consists of slightly-separated lower and upper plates 182 183, joined on one side by an edge piece 184, Fig. 57. The edge 184 is arranged parallel to the course of the apron 136 and is the actual gage against which the edges of the sheets are pressed. The plates 182 183, which are directed toward the sheets on the conveyer, serve merely to guide the edges of the sheets. The plate 182 serves to keep the sheets from getting under the edge piece 184, and the plate 183 serves to prevent the edges of the sheets from buckling after they reach the edge piece or from curling up over the edge piece. The space between the plates 182 183 is not closed opposite the edge piece 184, and through this space the edges of the sheets run. An end of the plate 182 is turned downward at 185 into the aforesaid transverse pocket for the purpose of directing the sheets over the plate as they advance upon it. The side gage is supported in such manner that its lower plate 182 shall be suspended slightly above or shall rest lightly upon the apron 136, and it may be so supported by securing the upper plate 183 to brackets 186, fixed to a carriage 187, carried by a bar 188, extending transversely above and adjacent to the apron 136 and supported by the side pieces 12 12ª.

The disk 179 is located over and adapted to bear upon the shaft 181, and the disk 180 is located forward of the disk 179 and is adapted to bear upon the plate 182. The disks may be placed at equal distances from the strip 184, but this is immaterial. The periphery of each disk is shown in Figs. 54 and 56 passing through an opening in the plate 183, and, if preferred, the periphery of the disk 180 may also pass through an opening in the plate 182 and bear upon the surface of the moving conveyer, or one or both disks may be placed outside of the space covered by the plates of the side gage, as shown in Fig. 6. The edges of the sheets as they pass over the shaft 181 and plate 182 pass under the disks 179 180, which are respectively fixed upon spindles 189 190, which turn freely in bearings 191 192, mounted upon and adapted to oscillate in a direction at right angles to the course of said spindles about studs 193 194, carried by the brackets 195 196, secured to the carriage 187.

The disks 179 180 are driven in the direction of the arrows in Fig. 54 with a surface speed approximately equal to the surface speed of the sheet-conveyer from a pulley 197, carried by the shaft 181, and through the medium of a band 198, which drives a pulley 199, mounted loosely upon a stud carried by the carriage 187, and through the further medium of a pulley 200, secured to the pulley 199, so as to turn with it, which drives, by means of a band 201, the pulleys 202 203 on the spindles 189 190, to which the disks are attached. The band 201 may be carried over intermediate pulleys 204 205 206 207. The pulleys 199, 200, and 206 may be carried by a bracket 208 and the pulley 207 by a second bracket 208. The brackets 208 208 may be adjustably secured to the carriage 187, and these brackets, together with the pulleys carried thereby, may be adjusted, as by screws 209, to give a proper driving tension to the bands 198 201.

210 211 are springs at one end connected to the bearings 191 192 at a point somewhat removed from the studs 193 194, as by passing under projections 212 on the bearings, and at their other ends attached to brackets 213, carried by the carriage 187, with capacity for vertical adjustment thereon, as by means of screws 214. The springs serve to give to the disks an elastic touch upon the sheets which pass under them, and by adjusting the brackets 213 the springs may be caused either to press upon or partly to suspend the ends of the bearings 191 192 and thereby regulate the downward pressure of the disks.

When long sheets are being carried by the conveyer, the forward ends of the sheets may pass off from the forward end of the conveyer and be received by the machine to be supplied before the rear parts of such sheets have passed from under the registering-disks. When this is the case, the machine being fed may seize the sheets and draw them forward faster than they are being carried forward by the conveyer, and when this is done the sheets will be drawn under the registering-disks faster than the surface speed at which the disks are driven. This action causes an excess of friction between the sheets and the disks when the disks are connected rigidly to their driving-pulleys; but by connecting the disks to their driving-pulleys by means which permit the disks to be turned by the frictional action of the swiftly-moving sheets upon their rims faster than the disks would be driven by the said pulleys this excess of friction is prevented. The pulley 203, Figs. 59, 60, and 61, is mounted loosely upon the spindle 190 and carries spring-pawls 215, adapted to engage with a ratchet 216, fixed on the spindle 190. The pulley, which turns in the direction of the arrow in Fig. 61, through the medium of the spring-pawls, the ratchet, and the spindle, drives the registering-disks. When the disk is rotated by the swiftly-moving sheet, as described, the ratchet slips under the spring-pawls, thereby permitting the disks to be rotated temporarily faster than the speed of the driving-pulley; but as soon as the swiftly-moving sheet has passed the pawls catch the teeth of the ratchet and the disk is rotated as before. The pulley 202 may be similarly connected to the spindle 189.

The carriage 187 may be adjusted transversely by sliding it along the bar 188 to bring the side gage and the registering-disks carried thereby into proper alinement with the pack of sheets in whatever position the pack may be placed by the adjustment of the sheet-holder upon the base-piece 1, and it may be so adjusted by means of the screw 217, supported by bearings carried by the bar 188, turned by the hand-wheel 219, and threaded through a nut or boss 218 in the carriage.

The driving-pulley 197 is adapted to slide along the shaft 181 while being turned by it, and may be so adapted by means of a key 220, fixed in the pulley and sliding in a longitudinal groove in the shaft, Figs. 54 and 55. By means of a yoke 221, adapted to a groove 222 in the hub of the pulley 197 and connected by a bracket 223 to the carriage 187, the pulley is caused to slide along the shaft 181 with every adjustment of the carriage, whereby this pulley is at all times maintained in proper driving position relatively to the other pulleys which drive the registering-disks.

The transverse adjustment of the registering device is usually less than half of the width of the feeding-machine. When this is the case, I cause the binding-cords 144 on that side of the machine not traversed by the registering device to pass from the roller 146 under the roller 147 to and about the roller 148 and from thence to the roller 149, Figs. 1 and 6; but the cords on that side traversed by the registering device pass from the roller 146 to and about the roller 147 and from thence to the roller 149. By this arrangement the cords on that side of the machine opposite the registering device bind one side of the sheets over the whole length of the apron 136, while the cords on the registering side of the machine are turned up, so as not to interfere with the adjustment of the registering device, and on this side the cords are not required to guide the sheets, because the edges of the sheets on this side are guided by the plates of the registry-side gage.

While I have shown the disk 179 placed over the shaft 181, this arrangement is not essential, as that disk may be arranged to act directly over the traveling surface of the apron, the same as the disk 180 is shown to do, and, if preferred, the shaft 181 may be dispensed with and the disks may be driven from any other convenient source. When the shaft 181 is not employed, the rolls 140 142 may be placed close together, so as to diminish the width of the pocket between them.

*The Driving Mechanism.*

Power and speed may be distributed to the various parts of my feeding-machine in many ways; but I will describe the means which I have shown for that purpose.

224 is the main driving-shaft, supported by the side frames 8 8ª and receiving power in any suitable manner, as from a sprocket-wheel carried by the machine which is being fed, driving, through the medium of a chain 225, a sprocket 226 on the shaft.

227 is a cone fixed on the shaft 224 and driving, through the medium of a belt 228, a cone 229, secured to a shaft 230. The belt 228 may be moved along the cones 227 229 by means of belt-forks 231 231, carried by a spider 232, threaded on a screw 233, turned by a hand-wheel 234. The spider 232 is caused to move transversely by the turning of the screw 233 and may be guided in its movements by a bar 235, over which the spider spans, and the movements of the spider in either direction may be limited by stops 236, carried by the bar 235. The shaft 230, screw 233, and bar 235 are all supported by the frame sides 8 8ª. By moving the belt 228 along the cones the speed of the shaft 230 may be varied.

The mechanism carried by the sheet-holder is driven from the counter-shafts 237 238, supported by the sides 2 2ª of the holder, and driven, respectively, the shaft 237 from a sprocket 239 on the shaft 224, which drives, through the medium of a chain 240, a sprocket 241 on the shaft 237, and the shaft 238 from a sprocket 242 on the shaft 230, which drives, through the medium of a chain 243, a sprocket 244 on the shaft 238. The sprockets 241 244 are carried by their shafts in such manner as to turn with the shafts, while the shafts may slide through the sprockets. Yokes 245 project from the side frame 8, and their outer ends engage shoulders on the sprockets 241 244, whereby the sprockets are prevented from moving transversely; but when the sheet-holder is adjusted the shafts 237 238 slide in the sprockets, thereby preserving the power connection to the mechanism carried by the sheet-holder in whatever position the holder may be adjusted.

The shaft 118, which carries the cams which operate the fingers 108 109, is driven from a sprocket 246 on the counter-shaft 238, which drives, through the medium of a chain 247, a sprocket 248 on the shaft 118. The chain 247 may be deflected by an idler-sprocket 249 away from the rollers 139 146 of the conveyer.

The shaft 65 of the buckling device is driven by a gear 250 on the shaft 118, which drives, through the medium of an intermediate gear 251, a gear 252 on a short shaft 253, which by means of bevel-gears 254 254 drives a short shaft 255, and a gear 256 on the latter shaft drives a gear 257 on the shaft 65. The short shafts 253 255 are supported by the bearing-bracket 258, carried by the side frame 2ª.

The crank-arm 100, which drives the disk 98 on the shaft 97, is driven by a gear 259 on the shaft 118 through the medium of an intermediate gear 260 and a gear 261, secured to the crank-arm.

The withdrawing-drum 86 is driven from a sprocket 262 on the counter-shaft 237 through the medium of a chain 263, which drives a sprocket 264, mounted loosely on a stud carried by the side frame 2ª, and through the further medium of a gear 265, secured to the sprocket 264, so as to turn with it, which drives, through the intermediate gears 266 267, a gear 268 on a journal of the drum.

The roller 134 is driven from the gear 267, which drives a gear 269 on a journal of the roller. This roller has also a similar gear 269 on its opposite journal.

The roller 135 is driven on each side of the machine the same and on each side by a gear 269 driving a gear 270 on the journal of the roller.

The endless apron 136 is driven by the roller 137, about which it passes, and the binding-cords 144 are driven by the roller 145, about which they pass. The rollers 137 145 are driven from a gear 271 on the shaft 224, which drives a gear 272 on a shaft 273, supported by the side frames 8 8ª, and a sprocket 274 on the shaft 273, through the medium of a chain 275, drives the two sprockets 276, one on each roller 137 145.

The transverse shaft 181, which drives the registering device, is driven from a gear 277 on the roller 141, which drives a gear 278 on the shaft 181. (These gears are inside of the frame and are shown in Fig. 6 and are indicated by dotted circles in Fig. 2.) The roller 141 is driven by the apron 136, which passes around it.

By the method of driving described the withdrawing-rollers and the conveyer are driven from the uniformly-rotated shaft 224, and these parts, which determine the velocity or rate of movement of the sheets as they are withdrawn from the pack and passed through the machine, have always the same speed; but the shaft 118 and the parts driven thereby are driven from the variably-speeded shaft 230, and these parts, which determine the rapidity with which sheets are successively separated from the pack, may have their speeds varied independently of the speed of the withdrawing and conveying devices.

In feeding a certain class of machines—as, for instance, a paper-ruling machine—the sheets are required to be supplied at a certain lineal rate—that is, a certain number of feet of total length of sheets must be passed per minute to the machine which is being fed. If the sheets being fed are long, fewer sheets are required to make up the lineal rate than if short sheets are being fed, and vice versa. By adjusting the belt 228 on the cones 227 229 any speed may be given to the shafts 230 118 and to the parts driven thereby that may be required to cause the sheets to be separated from the pack at a rate corresponding to the length of the sheet and the lineal rate at which they are to be delivered. The shaft 118 and parts driven thereby are moved slowly when long sheets and rapidly when short sheets are being fed.

In feeding machines—as, for instance, a printing-press—which require sheets to be supplied at a constant rate—that is, a definite number of sheets per minute irrespective of their length must be passed to the machine being fed—the variable-speed devices for driving the sheet-separating devices are not required, but the shaft 118 may be driven at a constant rate and might, for instance, be driven by a power connection from the main driving-shaft 224 without the intervention of variable-speed devices.

Sometimes a machine may require to be fed at one time by the lineal and at another time by the constant rate of feeding. Thus a paper-ruling machine when doing plain ruling requires to be fed at the lineal rate; but when the "striker" is used on the ruling-machine the machine requires to be fed at the constant rate, one sheet being required with each dropping of the striker-gate. In the construction shown in the drawings I have provided means for feeding sheets either at the lineal or at the constant rate and for easily changing the style of feeding, whereby a machine of the character last described may be fed at either rate of feeding, as required.

279, Figs. 3 and 15, is a sprocket on the shaft 230, driven by a chain 280, which connects the sprocket 279 to a sprocket (not shown) which is connected by a positive power connection to the power devices which operate the striker-gate or other periodically-operated mechanism of the machine to be supplied. The cone 229 and the sprocket 279 are each mounted on the shaft 230 with capacity to turn loosely thereon, and each may be connected to the shaft or may be disconnected therefrom. A toothed clutch-hub 281 is fixed to the cone 229, and a similar hub 282 is formed on one side of the sprocket 279. Toothed clutch-sleeves 283 284, which are carried by the shaft 230 in such manner as to turn therewith, while having capacity to move lengthwise thereon, are adapted, respectively, to the clutch-hubs 281 282. Yokes 285 286, respectively adapted to grooves 287 288 around the clutch-sleeves 283 284 and carried by a rod 289, sliding in bearings in the frame sides 8 8$^a$, are adapted to move the sleeves 283 284 along the shaft 230 to engage or disengage the sleeves from the clutch-hubs 281 282. The said clutch hubs, sleeves, yokes, and rod are so arranged that when the rod is moved in one direction, as to the right in Fig. 15, the sleeves 283 284 will each be moved to the right, the sleeve 283 being moved toward, but the sleeve 284 being moved away from, its corresponding clutch-hub; but when the rod 289 is moved in the opposite direction, as to the left in Fig. 15, the sleeves 283 284 will each be moved to the left, the sleeve 284 being moved toward, but the sleeve 283 being moved away from, its corresponding clutch-hub. When the sleeves 283 284 are moved to the right, the teeth of the clutch-sleeve 283 will engage the teeth of the clutch-hub 281 on the cone 229, but the sleeve 284 will become disengaged from the hub 282 on the sprocket 279. When this is done, the cone 229 will be connected to the shaft 230 and will drive that shaft and the parts driven therefrom to adapt the machine for feeding sheets at the lineal rate, while the sprocket 279 is permitted to turn loosely upon the shaft 230. When the sleeves 283 284 are moved to the left, the teeth of the clutch-sleeve 284 will engage the teeth of the clutch-hub 282 on the sprocket 279, but the sleeve 283 will become disengaged from the hub 281 on the cone 229. When this is done, the sprocket 279 will be connected to the shaft 230 and will drive that shaft and the parts driven therefrom synchronously with the periodic movements of the striker-gate or other periodically-operated mechanism of the machine being fed, and the feeding-machine will be adapted to feed sheets at the constant rate, while the cone 229 is permitted to turn loosely upon the shaft 230. Thus by moving the rod 289 the feeding-machine may be adapted to feed sheets either at the lineal or at the constant rate.

*Operation of the Machine.*

From the foregoing description of the machine its operation in feeding sheets will be readily understood. The sheet-holder is adjusted laterally to bring the side guide carried by it to a proper position relatively to the medial line of the machine to be supplied, the registering device is adjusted to the proper position transversely, the bottom of the holder is adjusted to the proper height, a pack of sheets is placed in the holder, the pressers are placed behind the pack, the tension of the springs which press the buckler guard-plate and the buckling-pad against the pack are adjusted to suit the character of the sheets in the pack, such fingers 109 and the top pressers corresponding therewith as are not required for use are put out of action, the speed of the sheet-individualizing devices are adapted by making the proper power connection thereto to feed sheets either at the lineal or at the constant rate, and if the feeding is to be done at the lineal rate the actual speed of the individualizing devices is regulated by a proper adjustment of the belt on the cones which drive them. The machine is then started in operation. The sheets are individualized, withdrawn from the pack, placed upon the conveyer and registered while passing upon the conveyer in the manner already described, and are then delivered to the mechanism which is to further act upon them.

It is apparent that many details of construction shown are not material to my invention and may be varied in many ways without departing from it, and that portions of my invention may be employed independently of other portions of it, and that in adapting my improved feeding mechanism to different purposes features of the mechanism not required may be omitted.

If preferred, instead of using the buckling device herein described for raising the corners of the sheets preparatory to the operation of the fingers 108 109 the corners of the sheets may be raised by means of a reciprocating suction-nozzle—for instance, a nozzle similar to the nozzle shown in Letters Patent to me No. 531,438, dated December 25, 1894.

Having now described my invention, what I claim as new, and desire to secure by Letters Patent, is—

1. The combination of a sheet-holder adapted to support a pack of sheets, a series of clips adapted at intervals to overlap an edge of the pack and operating to retain the ends of the outermost sheets in proper alinement while having capacity to yield and move out of the way when an edge of the outermost sheet is bent outward from under said clips, an individualizing device adapted to raise a corner on that edge of the outermost sheet which is overlapped by the said clips and an edge-bending device adapted to operate first on that corner of the sheet raised by the individualizing device and thence gradually to bend outward the edge of the sheet and push it out from under said clips one by one in order from the corner of the sheet first raised.

2. A sheet-holder adapted to support a pack of sheets upon their edges in a more or less upright position having an upwardly and rearwardly inclined bottom piece for the lower edges of the sheets in the pack to rest upon and an inclined front against which the pack may lean with its end projecting above the front, in combination with a series of retaining-points adapted to overlap the foremost upper edge of the pack and operating to retain the ends of the foremost sheets in proper alinement, and a transverse heel or ridge adapted to intercept the upper edges of the sheets in the pack along a line in the rear of said retaining-points to prevent the sheets in the rear of said heel or ridge from pressing the foremost sheets in the pack against the said points.

3. A sheet-holder adapted to support a pack of sheets upon their edges in a more or less upright position having an upwardly and rearwardly inclined bottom piece for the lower edges of the sheets in the pack to rest upon and an inclined front against which the pack may lean with its end projecting above the front, in combination with the spring-clips 40, the adjustable transverse bar 41 carrying said clips, and a heel or ridge 42 on said bar, substantially as and for the purposes described.

4. A sheet-holder adapted to support a pack of sheets upon their edges in a more or less upright position having an upwardly and rearwardly inclined bottom piece for the lower edges of the sheets in the pack to rest upon and an inclined front against which the pack may lean with its end projecting above the front, in combination with a series of spring-clips adapted at intervals to overlap the foremost upper edge of the pack and operating to retain the ends of the foremost sheets in proper alinement, an individualizing device adapted to raise a corner of that edge of the foremost sheet which is overlapped by said clips, an edge-bending device adapted to operate first on that corner of the sheet raised by the individualizing device and thence gradually to bend outward the edge of the sheet and slip it out from under said clips one by one in succession from the first-raised corner of the sheet, and a transverse heel or ridge arranged to intercept the upper edges of the sheets in the pack along a line in the rear of said clips and adapted to hold those sheets which lie in the rear of said heel or ridge from pressing upon the foremost sheets so as to interfere with the proper action of said individualizing and edge-bending devices.

5. A sheet-holder adapted to support a pack of sheets upon their edges in a more or less upright position having a movable upwardly and rearwardly inclined bottom piece for the lower edges of the sheets in the pack to rest upon and an inclined front against which the pack may lean with its end projecting above the front, in combination with a series of retaining-points arranged above the said front and adapted to retain the upper ends of the foremost sheets in proper alinement, a transverse heel or ridge adapted to intercept the upper edges of the sheets in the pack along a line in the rear of said retaining-points to prevent the sheets in the rear of said heel or ridge from pressing the foremost sheets in the pack against the said points, and a device for adjusting said bottom piece vertically whereby the foremost upper edge of packs of sheets in the holder may be maintained horizontally in line with said retaining-points notwithstanding that packs of sheets of different lengths may from time to time be placed in the holder.

6. A sheet-holder adapted to support a pack of sheets upon their edges in a more or less upright position having an inclined front against which the pack may lean with its end projecting above the front, the said front being shaped with the plane of its lower part set at an angle widely from the vertical but with its upper part curved gradually rearwardly until its extreme top lies in a plane more nearly approaching the vertical plane than the plane of its lower part, for the purpose described, in combination with a device for retaining the upper ends of the projecting foremost sheets of the pack in proper alinement, and sheet-withdrawing devices adapted to seize upon the upper end of the foremost sheet and to withdraw that sheet forwardly over the upper edge of the front.

7. A sheet-holder adapted to support a pack of sheets upon their edges in a more or less upright position having an inclined front consisting of a series of idler-rollers against which the pack may lean with its end projecting above the topmost roller of the front, the said idler-rollers being arranged in such manner that the faces of those rollers which form the lower part of the front shall lie in a plane sloping at an angle widely from the vertical while the faces of those rollers which form the upper part of the front shall form a surface curved gradually rearwardly until the faces of the rollers forming the extreme top of the front shall lie in a plane more nearly approaching the vertical plane than the plane in which the faces of the rollers forming the lower part of the front are placed, for the purpose described, in combination with a device for retaining the upper ends of the projecting foremost sheets of the pack in proper alinement, and sheet-withdrawing devices adapted to seize upon the upper end of the foremost sheet and to withdraw that sheet forwardly over the upper edge of the front.

8. A sheet-holder having an upwardly and rearwardly inclined bottom piece for the lower edges of the sheets in a pack to rest upon and an inclined front against which a pack of sheets may lean with its end projecting above the front, the said front being shaped with the plane of its lower part set at an angle widely from the vertical but with its upper part curved gradually rearwardly until its extreme top lies in a plane more nearly approaching the vertical plane than the plane of its lower part, a series of retaining-points adapted to overlap at intervals the foremost upper edge of the pack, and a heel or ridge to intercept the upper edges of the sheets in the pack along a line in the rear of said retaining-points, all combined substantially as described for the purpose of supporting a pack of sheets upon their edges in a more or less upright position and for retaining the upper ends of the foremost sheets in proper alinement with freedom from the pressure of the more rearward sheets of the pack, and all in combination with sheet-withdrawing devices adapted to seize upon the upper end of the foremost sheet and to withdraw that sheet forwardly from over the upper edge of the front.

9. A sheet-holder adapted to support a pack of sheets upon their edges in a more or less upright position having an inclined front for a face of the pack to lean against and a bottom movable in respect to said inclined front for the lower edges of the sheets in the pack to rest upon, in combination with withdrawing devices adapted to act upon the upper edges of successive sheets and withdraw them from the holder, means to adjust the movable bottom to bring the upper edges of the sheets carried thereby to a proper height to be operated upon by the withdrawing devices, a raised edge or guard along the foremost edge of the movable bottom adapted to retain the lower edges of the foremost sheets in the pack, and supports for said edge or guard attached to the bottom with capacity to move laterally in respect thereto whereby said guard or edge may be permitted to rest against the inclined front at all times notwithstanding that the space between the foremost edge of the bottom and the front may not be the same in each position to which the bottom may be adjusted.

10. A sheet-holder adapted to support a pack of sheets upon their edges in a more or less upright position, having an inclined front for a face of the pack to lean against and an upwardly and rearwardly inclined bottom 19 movable in respect to said inclined front for the lower edges of the sheets in the pack to rest upon, in combination with withdrawing devices adapted to seize upon the upper ends of successive sheets and withdraw them forwardly from the pack over the upper edge of the front, means to adjust the movable bottom to bring the upper edges of the sheets carried thereby to a proper height to be operated upon by the withdrawing devices, the grooves 39 in the bottom piece 19, the bars 38 adapted to slide loosely in the grooves 39, and the edge or guard 37 attached to said bars, the said grooves bars and edge or guard being arranged substantially as described to adapt the edge or guard to rest against the inclined front and to retain the lower edges of the foremost sheets in the pack at all times notwithstanding that the space between the foremost edge of the bottom and the front may not be the same in each position to which the bottom may be adjusted.

11. A sheet-holder adapted to support a pack of sheets upon their edges in a more or less upright position having an inclined front rearwardly curved at its upper end and an upwardly and rearwardly inclined vertically-adjustable bottom piece 19, combined with the grooves 39, the bars 38, and the edge or guard strip 37, substantially as and for the purpose described.

12. The combination of the finger-holder 46, the dovetailed socket 46$^a$ formed in said holder, the buckling-finger 44, the beveled shank 47 forming part of said finger and adapted to said socket, a set-screw 48 passing through said holder and adapted to impinge upon said shank, a stop 49 carried by said holder and underlying said shank, a frictional pad carried by said finger, and means for operating said holder to cause it to move the finger carried thereby in such manner that the said pad may be moved against the outermost sheet in a pack of sheets to form a buckle therein.

13. The combination of a shoe 50, the finger-holder 46 pivoted to said shoe, a spring adapted to bind said holder to said shoe, a buckling-finger carried by said holder, and means for operating said shoe and the parts carried thereby so as to move said finger forward against the outermost sheet in a pack of sheets and to retract it therefrom, the said holder having capacity to tilt on its pivotal connection with said shoe against the action of said spring in a direction substantially at right angles to that of the forward movement of said finger, for the purpose set forth.

14. The combination of the shoe 50, the finger-holder 46 pivoted to said shoe, a spring adapted to bind said holder to said shoe, a buckling-finger, a clamping device carried by said holder adapted to detachably secure said finger to the holder, and means for operating said shoe and the parts carried thereby so as to move said finger forward against the outermost sheet in a pack of sheets and to retract it therefrom, the said holder having capacity to tilt on its pivotal connection with said shoe against the action of said spring when the buckling-finger moves forward to buckle a sheet, as set forth.

15. The shoe 50, ears 51 on said shoe, the finger-holder 46, an extension 52 forming part of said holder and pivotally connected to said ears, the ear 53 carried by said shoe and adapted to brace said holder, the spring 54 adapted to bind said holder to said shoe, and the buckling-finger 44 carried by said holder, all combined substantially as described to permit of the tilting of the buckling-finger when it is moved forward to buckle a sheet and all in combination with means for operating said shoe and the parts carried thereby so as to move said finger forward against the outermost sheet in a pack of sheets and to retract it therefrom.

16. A buckling-finger, the lever 56 provided with arms 55 and 68, the lever 59 provided with arms 58 and 69, the link 57 pivoted to said arm 58, means for pivotally connecting said finger to said arm 55 and to said link 57, the projection 79 from said arm 58 and underlying said link, the stud 60, a support for said stud, the cams 63, 64, and the springs 70, 71, all combined and operated substantially as described.

17. The shoe 50, the finger-holder 46 pivoted to said shoe, a spring adapted to bind said holder to said shoe, a buckling-finger carried by said holder, the lever 56 provided with arms 55 and 68, the lever 59 provided with arms 58 and 69, the link 57 pivoted to said arm 58, a pivotal connection between said arm 55 and said shoe, a pivotal connection between said link 57 and said shoe, the projection 79 from said arm 58 and underlying said link, the stud 60, a support for said stud, the cams 63, 64, and the springs 70, 71, all combined and operating substantially as described.

18. The combination of means to separate the foremost edges of successive sheets from a pack of sheets and bend them one by one outward therefrom, a rotary withdrawing-drum mounted adjacent to the pack of sheets near that edge which is operated on by the separating means, the heads 91, slideways 91ᵃ formed in said heads, bearings 90 adapted to move in said slideways, the frictional rollers 87, 88 having journals 89 adapted to said bearings, springs 93 adapted to press said bearings outward in their slideways, stops carried by said heads adapted to limit the outward movement of said bearings, power devices for rotating said heads in unison, and means for supporting said heads in such manner that they may be rotated about a common axis and in such positions that when they are so rotated they will revolve the said rollers with their outer edges moving in a cylindrical pathway tangential or slightly secant to the periphery of said drum and will pass the rollers alternately behind the outwardly-bent edges of successive sheets whereby each roller as it is moved behind the outwardly-bent edge of a sheet will press that edge against the drum with a yielding pressure and cause a sheet to be withdrawn to a greater or less extent from the pack.

19. The combination of a rotary withdrawing-drum, two frictional rollers adapted to act alternately in conjunction with said drum each to withdraw a sheet to a greater or less extent from a pack of sheets, and means to revolve the axis of each of said rollers with an intermittent movement whereby the outer edges of the rollers will move in a cylindrical pathway tangential or slightly secant to the periphery of said drum and whereby the rollers will make successive contacts with the drum and when in contact with the drum each roller will rest from its revolving motion while it acts in conjunction with the drum upon a sheet.

20. The combination with the rotary withdrawing-drum of two frictional rollers adapted to act alternately in conjunction with said drum each to withdraw a sheet to a greater or less extent from a pack of sheets, bearings for each of said rollers, and intermittently-rotating supports for said bearings arranged in such manner that by rotating the supports intermittently the said bearings and the rollers carried thereby will be caused to revolve intermittently with their outer edges moving in a cylindrical pathway tangential or slightly secant to the periphery of said drum and will thereby be caused to make successive contacts with the drum and when in contact with the drum each roller will cease from its revolving motion while it acts in conjunction with the drum upon a sheet.

21. Edge-bending devices adapted to separate the foremost edges of successive sheets from a pack of sheets and bend them one by one outward therefrom, in combination with withdrawing devices for seizing successively upon the outwardly-bent edges of the sheets and withdrawing the sheets from the pack embracing a rotary withdrawing-drum and two frictional rollers mounted upon and intermittently revolved by intermittently-rotating supports in such manner that the outer edges of the rollers will move in a cylindrical pathway tangential or slightly secant to the periphery of said drum, whereby the rollers will be caused to act alternately in conjunction with said drum upon successive sheets and whereby each roller will be caused to rest from its revolving motion while it acts in conjunction with the drum and will thereafter be caused to move forward and permit its companion roller to act in conjunction with the drum upon another sheet.

22. The combination of means to separate the foremost edges of successive sheets from a pack of sheets and bend them one by one outward therefrom, two frictional rollers arranged adjacent each to the other and each mounted so as to rotate freely in its bearings, bearings for each of said rollers, means for supporting said bearings in such manner that they may revolve about a common axis and in such positions that when they so revolve they will move the said rollers in a cylindrical pathway intersecting the curved pathway followed by the edge of a sheet as it is bent outward, a rotary withdrawing-drum mounted in such a position relatively to the pack of sheets and to the cylindrical pathway of said rollers that each of said rollers as it is moved behind the outwardly-bent edge of a sheet may press that edge against the drum, power devices to move said rollers with an intermittent movement around their cylindrical pathway, whereby the said rollers will be caused to pass alternately behind the outwardly-bent edges of successive sheets and press those edges successively against said drum and whereby while each roller is pressing a sheet against the drum it will rest temporarily from its revolving movement and act in conjunction with the drum to withdraw a sheet to a greater or less extent from the pack and will then move forward by a renewal of its revolving motion and permit its companion roller to pass behind and press another sheet against the drum and act thereon, and springs arranged to cause a yielding pressure between either of said rollers and said drum when a roller is pressed against the drum.

23. The combination of means to separate the foremost edges of successive sheets from a pack of sheets and bend them one by one outward therefrom, a rotary withdrawing-drum mounted adjacent to the pack of sheets near that edge which is operated on by the separating means, the heads 91, slideways 91ª formed in said heads, bearings 90 adapted to move in said slideways, the frictional rollers 87, 88 having journals 89 adapted to said bearings, springs 93 adapted to press said bearings outward in their slideways, stops carried by said heads adapted to limit the outward movement of said bearings, means for supporting said heads in such manner that they may be rotated about a common axis and in such positions that when they are so rotated they will revolve the said rollers with their outer edges moving in a cylindrical pathway tangential or slightly secant to the periphery of said drum and will pass the rollers alternately behind the outwardly-bent edges of successive sheets, and power devices to rotate said heads intermittently whereby each of said rollers will be caused to pass behind the outwardly-bent edge of a sheet and press that edge with a yielding pressure against said drum and whereby while each roller is pressing a sheet against the drum it will rest temporarily in contact with said drum while it acts in conjunction with the drum to withdraw a sheet to a greater or less extent from the pack and whereby after a roller has acted on a sheet it will be moved forward to permit its companion roller to pass behind and press another sheet against the drum and act thereon.

24. The combination of means to separate the foremost edges of successive sheets from a pack of sheets and bend them one by one outward therefrom, two frictional rollers arranged adjacent each to the other and each mounted so as to rotate freely in its bearings, bearings for each of said rollers, means for supporting said bearings in such manner that they may revolve about a common axis and in such positions that when they so revolve they will move the said rollers in a cylindrical pathway intersecting the curved pathway followed by the edge of a sheet as it is bent outward, a rotary withdrawing-drum mounted in such a position relatively to the pack of sheets and to the cylindrical pathway of said rollers that each of said rollers as it is moved behind the outwardly-bent edge of a sheet may press that edge against the drum, power devices to move said rollers with an intermittent movement around their cylindrical pathway, whereby the said rollers will be caused to pass alternately behind the outwardly-bent edges of successive sheets and press those edges successively against said drum and whereby while each roller is pressing a sheet against the drum it will rest temporarily from its revolving movement and act in conjunction with the drum to withdraw a sheet partially from the pack and will then move forward by a renewal of its revolving motion and permit its companion roller to pass behind and press another sheet against the drum and act thereon, and an auxiliary withdrawing device adapted to act upon the partially-withdrawn sheets and to assist in withdrawing them from the pack.

25. The heads 91, bearings 90 carried by said heads, the frictional rollers 87, 88 having journals 89 adapted to said bearings, journals 92 supporting said heads, fixed bearings for the journals 92, a gear 95 on each journal 92, the transverse shaft 97, a gear 96 on each end of said shaft adapted to a gear 95, a rotary withdrawing-drum located adjacent to said rollers, and a power device to drive said shaft 97 with an intermittent rotary movement, all combined substantially as and for the purpose described.

26. The heads 91, bearings 90 carried by said heads, the frictional rollers 87, 88 having journals 89 adapted to said bearings, journals 92 supporting said heads, fixed bearings for the journals 92, a rotary withdrawing-drum located adjacent to said rollers, springs arranged to cause a yielding pressure between said drum and one of said rollers when a roller is in contact with the drum, a gear 95 on each journal 92, the shaft 97 extending transversely across the machine through the hollow journals of said drum, a gear 96 on each end of said shaft adapted to a gear 95, and a power device to drive said shaft 97 with an intermittent rotary movement, all combined substantially as and for the purpose described.

27. The combination of a rotary withdrawing-drum, a frictional roller, bearings for said roller, supports for said bearings arranged in such manner that by the rotating of the supports the said bearings and the roller carried thereby will be caused to revolve in unison about a common axis and in such positions that when they so revolve the outer edges of the roller will move in a cylindrical pathway tangential or slightly secant to the periphery of said drum, power devices consisting of the disk 98 mounted with capacity to rotate about a fixed axis, radial grooves formed across the face of said disk, the constantly-rotating crank-arm 100, the pin 101 carried by said arm and adapted to operate in said radial grooves, and a power connection from said disk 98 to said supports, the said power devices operating to rotate said supports in unison with an intermittent rotary motion, and a locking device operating to hold said supports in a fixed position during the interval between one intermittent movement and another, for the purpose described.

28. The drum 86, the frictional rollers 87, 88, journals 89, bearings 90, heads 91 carrying said bearings, the journals 92, fixed bearings for the journals 92, a gear 95 on each journal 92, the transverse shaft 97, a gear 96 on each end of said shaft, a disk 98 fixed on one end of said shaft, radial grooves formed across the face of said disk, the crank-arm 100, a pin 101 carried by said crank-arm and adapted to said radial grooves, a power device to drive said arm 100 with a constant rotary movement whereby said pin 101 may act in said radial grooves to move said disk and, through the medium of said shaft, gears and journals 92 to move the heads 91 with an intermittent rotary movement, and a locking device operating to hold said heads in a fixed position during the interval between one intermittent rotary movement and another all combined substantially as and for the purpose described.

29. The drum 86, the frictional rollers 87, 88, journals 89, bearings 90, heads 91 carrying said bearings, the journals 92, fixed bearings for the journals 92, and power devices consisting of the disk 98 mounted with capacity to rotate about a fixed axis, radial grooves formed across the face of said disk, the constantly-rotating crank-arm 100, the pin 101 carried by said arm and adapted to operate in said radial grooves, scallops 103 formed on the periphery of said disk, a disk 104 adapted to said scallops and connected to the arm 100 so as to turn with it and cut away on one side adjacent to said arm, and a power connection from disk 98 to said journals 92, all combined substantially as and for the purpose described.

30. The drum 86, the frictional rollers 87, 88, journals 89, bearings 90, heads 91, slideways 91ª, journals 92, springs 93, casings 94, gears 95, 96, shaft 97, disk 98, grooves 99, arm 100, pin 101, roller 102, scallops 103, disk 104, cutaway place 105, and power devices to drive said drum and arm each with a constantly-rotating movement all arranged and combined substantially as and for the purpose described.

31. The combination of a series of retaining-points adapted to overlap an edge of a pack of sheets and operating to retain the ends of the outermost sheets in proper alinement, an individualizing device adapted to raise a portion of the outermost sheet on that edge which is overlapped by said retaining-points, and a series of fingers adapted to reciprocate in a plane parallel with and adjacent to the face of that end of the pack on which said individualizing device operates and in a direction substantially at right angles to that edge which is overlapped by said retaining-points, and acting in succession whereby one finger will pass first under the portion of the sheet raised by the individualizing device and thereafter the other fingers will pass successively behind the edge of the sheet and gradually slip it out from under said retaining-points and bend the edge outward from the pack substantially in the manner described.

32. The combination of a series of spring-clips 40 adapted at intervals to overlap an edge of a pack of sheets and operating to retain the ends of the outermost sheets in proper alinement, an individualizing device adapted to raise a portion of the outermost sheet on that edge which is overlapped by said clips, a series of fingers 108, 109 adapted to reciprocate in a plane parallel with and adjacent to the face of that end of the pack on which said individualizing device operates and in a direction substantially at right angles to the edge which is overlapped by said clips, the said finger 108 being arranged to operate in line with that portion of the edge of the sheet which is raised by the individualizing device and one finger 109 being arranged to operate in the interval between each pair of adjacent clips 40, and power devices adapted to operate said fingers in succession to cause the finger 108 to pass first under that portion of the sheet raised by the individualizing device and thereafter to cause the fingers 109 to pass successively behind the edge of the sheet, the action of all of the fingers being to gradually slip the edge of the sheet out from under said clips and bend it outward from the pack, substantially in the manner described.

33. The combination of a series of retaining-points adapted to overlap an edge of a pack of sheets and operating to retain the ends of the outermost sheets in proper alinement, an individualizing device adapted to raise a portion of the outermost sheet on that edge which is overlapped by said retaining-points, a series of reciprocating fingers 108, 109, guides to direct the movements of said fingers, and power devices consisting of the arms 112, 114, the fulcrum-bars 113, 115, the links 116, the rotating cams 117 and the springs 122, the said power devices being adapted to reciprocate said fingers in succession to cause the fingers to act in conjunction with said individualizing device and said retaining-points to bend an edge of a sheet outward from the pack.

34. The combination of a series of retaining-points adapted to overlap an edge of a pack of sheets and operating to retain the ends of the outermost sheets in proper alinement, an individualizing device adapted to raise a portion of the outermost sheet on that edge which is overlapped by said retaining-points, a series of reciprocating fingers 108, 109 adapted to operate in conjunction with said individualizing device and said retaining-points to bend an edge of a sheet outward from the pack, and finger operating and guiding devices adapted to operate said fingers in succession and to guide them in their movements consisting of the arms 112, 114, the fulcrum-bars 113, 115, the links 116, the cams 117, the rotating shaft 118, the bar 121, the springs 122, the projections 123 and the clip 131.

35. The combination of a series of retaining-points adapted to overlap an edge of a pack of sheets and operating to retain the ends of the outermost sheets in proper alinement, an individualizing device adapted to raise a portion of the outermost sheet on that edge which is overlapped by said retaining-points, a series of reciprocating fingers adapted to operate in conjunction with said individualizing device and said retaining-points to bend an edge of a sheet outward from the pack, guides to direct the movements of said fingers, power devices adapted to reciprocate said fingers in succession, and a device to retain said fingers individually in a retracted position where they will not be operated by said power devices for the purpose described.

36. The combination of a series of retaining-points adapted to overlap an edge of a pack of sheets and operating to retain the ends of the outermost sheets in proper alinement, an individualizing device adapted to raise a portion of the outermost sheet on that edge which is overlapped by said retaining-points, a series of reciprocating fingers adapted to operate in conjunction with said individualizing device and said retaining-points to bend an edge of a sheet outward from the pack, guides to direct the movements of said fingers, a transverse bar 41, pockets 126 formed in said bar, and power devices for operating individually each of said fingers each power device for each finger consisting of an arm 112, an arm 114, a fixed fulcrum-bearing for each of said arms, a link 116, a rotating cam 117 and a spring 122, the relative positions of the said fingers, pockets, and power devices being such that when a finger is not required for use it may be retracted and its point may be placed in one of said pockets whereby such finger and its corresponding arms may be retained in a retracted position out of the reach of the cam 117.

37. The combination of a series of retaining-points adapted to overlap an edge of a pack of sheets and operating to retain the ends of the outermost sheets in proper alinement, an individualizing device adapted to raise a portion of the outermost sheet on that edge which is overlapped by said retaining-points, a series of reciprocating fingers adapted to operate in conjunction with said individualizing device and said retaining-points to bend an edge of a sheet outward from the pack, means for clamping the pack along a transverse line under the outwardly-bent edge of a sheet, and a withdrawing device adapted to seize upon the outwardly-bent edge of a sheet and to withdraw the sheet from the pack.

38. The combination of a series of retaining-points adapted at intervals to overlap an edge of a pack of sheets and operating to retain the ends of the outermost sheets in proper alinement, an individualizing device adapted to raise a portion of the outermost sheet on that edge which is overlapped by said retaining-points, a series of fingers adapted to reciprocate in a plane parallel with and adjacent to the face of that end of the pack on which said individualizing device operates and in a direction substantially at right angles to the edge which is overlapped by said retaining-points one of said fingers being arranged to operate in line with that portion of the edge of the sheet which is raised by the individualizing device and one other finger being arranged to operate in the interval between each pair of adjacent retaining-points, power devices to operate said fingers in succession to cause that finger which operates in line with the said raised portion of the sheet to pass first under that portion of the sheet and thereafter to cause the other fingers to pass successively behind the edge of the sheet and gradually to slip the edge out from under said retaining-points and bend it outward from the pack, means for clamping the pack along a transverse line under the outwardly-bent edge of a sheet, and a withdrawing device adapted to seize upon the outwardly-bent edge of a sheet and to withdraw the sheet from the pack.

39. The combination of a series of retaining-points adapted to overlap an edge of a pack of sheets and operating to retain the ends of the outermost sheets in proper alinement, an individualizing device adapted to raise a portion of the outermost sheet on that edge which is overlapped by said retaining-points, a series of reciprocating fingers adapted to operate in conjunction with said individualizing device and said retaining-points to bend an edge of a sheet outward from the pack, a device operating on said fingers to cause them to move against and clamp the pack after they have operated to bend the edge of a sheet outward, and a withdrawing device adapted to seize upon the outwardly-bent edge of a sheet and to withdraw the sheet from the pack.

40. The combination of a series of spring-clips 40 adapted at intervals to overlap an edge of a pack of sheets and operating to retain the ends of the outermost sheets in proper alinement, an individualizing device adapted to raise a portion of the outermost sheet on that edge which is overlapped by said clips, a series of fingers 108, 109 adapted to reciprocate in a plane parallel with and adjacent to the face of that end of the pack on which said individualizing device operates and in a direction substantially at right angles to the edge which is overlapped by said clips, the said finger 108 being arranged to operate in line with that portion of the edge of the sheet which is raised by the individualizing device and one finger 109 being arranged to operate in the interval between each pair of adjacent clips 40, and power devices adapted to operate said fingers in succession to cause the finger 108 to pass first under that portion of the sheet raised by the individualizing device and thereafter to cause the fingers 109 to pass successively behind the edge of the sheet, the action of all of the fingers being to gradually slip the edge of the sheet out from under said clips and bend it outward from the pack, a device operating on said fingers 109 to cause them to move against and clamp the pack after they have passed behind the edge of a sheet, and a withdrawing device adapted to seize upon the outwardly-bent edge of a sheet and to withdraw the sheet from the pack.

41. The combination of a series of retaining-points adapted to overlap an edge of a pack of sheets and operating to retain the ends of the outermost sheets in proper alinement, an individualizing device adapted to raise a portion of the outermost sheet on that edge which is overlapped by said retaining-points, a series of reciprocating fingers 108, 109 adapted to operate in conjunction with said individualizing device and said retaining-points to bend an edge of a sheet outward from the pack, the transverse bar 121 adapted to move against said fingers 109 and thereby cause the fingers to clamp the pack after they have operated to bend the edge of a sheet outward and to move away and release the fingers after the withdrawal of the outermost sheet has been commenced, and a withdrawing device adapted to seize upon the outwardly-bent edge of a sheet and to withdraw the sheet from the pack.

42. The combination of a series of retaining-points adapted to overlap an edge of a pack of sheets and operating to retain the ends of the outermost sheets in proper alinement, an individualizing device adapted to raise a portion of the outermost sheet on that edge which is overlapped by said retaining-points, a series of reciprocating fingers 108, 109 adapted to operate in conjunction with said individualizing device and said retaining-points to bend an edge of a sheet outward from the pack, the transverse bar 121, the pendants 127 supporting said bar, the studs 128 upon which said pendants swing, the rotating cams 129 adapted to move said bar against said fingers 109 and to press those fingers upon and clamp the pack after they have operated to bend the edge of a sheet outward and then after the withdrawal of the outermost sheet has been commenced, to permit said bar to swing outward and release the fingers, and a withdrawing device adapted to seize upon the outwardly-bent edge of a sheet and to withdraw the sheet from the pack.

43. The combination of a series of retaining-points adapted to overlap an edge of a pack of sheets and operating to retain the ends of the outermost sheets in proper alinement, an individualizing device adapted to raise a portion of the outermost sheet on that edge which is overlapped by said retaining-points, a series of reciprocating fingers adapted to operate in conjunction with said individualizing device and said retaining-points to bend an edge of a sheet outward from the pack, a transverse bar adapted to guide said fingers in their reciprocations, supports for said bar, cams adapted to move said bar against said fingers and to press the fingers upon and clamp the pack after they have operated to bend the edge of a sheet outward and then, after the withdrawal of the outermost sheet has been commenced, to permit said bar to move outward and release the fingers, springs adapted to move said bar against the action of said cams, adjustable stops adapted to limit the outward movement of said bar, and a withdrawing device adapted to seize upon the outwardly-bent edge of a sheet and to withdraw the sheet from the pack.

44. The combination of a series of retaining-points adapted to overlap an edge of a pack of sheets and operating to retain the ends of the outermost sheets in proper alinement, an individualizing device adapted to raise successively a portion of each successive sheet on that edge which is overlapped by said retaining-points, a series of reciprocating fingers adapted to operate in conjunction with said individualizing device and said retaining-points to bend the edges of successive sheets one by one outward from the pack, means for successively clamping the pack along a transverse line below the outwardly-bent edges of the sheets, and withdrawing devices for seizing successively upon the outwardly-bent edges of the sheets and withdrawing the sheets from the pack embracing a rotary withdrawing-drum and two frictional rollers mounted upon rotating supports in such manner that when the said supports are rotated the rollers will be revolved in unison with their outer edges moving in a cylindrical pathway tangential or slightly secant to the periphery of said drum whereby the rollers will be caused to act alternately in conjunction with said drum upon successive sheets.

45. The combination of a series of retaining-points adapted to overlap an edge of a pack of sheets and operating to retain the ends of the outermost sheets in proper alinement, an individualizing device adapted to raise successively a portion of each successive sheet on that edge which is overlapped by said retaining-points, a series of reciprocating fingers adapted to operate in conjunction with said individualizing device and said retaining-points to bend the edges of successive sheets one by one outward from the pack, a device operating upon said fingers to cause them to move against and clamp the pack after each operation by which they bend the edge of a sheet outward, withdrawing devices for seizing successively upon the outwardly-bent edges of the sheets and withdrawing the sheets from the pack embracing a rotary withdrawing-drum and two frictional rollers mounted upon and intermittently revolved by intermittently-rotating supports in such manner that the outer edges of the rollers will move in a cylindrical pathway tangential or slightly secant to the periphery of said drum, whereby the rollers will be caused to act alternately in conjunction with said drum upon successive sheets and whereby each roller will be caused to rest from its revolving motion while it acts in conjunction with the drum and will thereafter be caused to move forward and permit its companion roller to act in conjunction with the drum upon another sheet.

46. A sheet-holder adapted to support a pack of sheets upon their edges in a more or less upright position having an inclined front against which the pack may lean, in combination with devices for withdrawing sheets from the upper edge of that face of the pack which leans against the inclined front, a transverse rod 155, a transverse rod 156, a presser suspended from said rods and adapted to rest against the rear or back of the pack along its upper edge and to press the sheets toward the inclined front and thereby hold the upper edges of the sheets against the action of the withdrawing devices, antifriction-rollers on each end of each of said rods, upper and lower ribs 161, forming inclined trackways adapted to support said antifriction-rollers and to guide them and the said rods and the pressers suspended from the rods toward the said front, the said ribs acting also in conjunction with said rollers and rods to prevent the rearward swinging of the presser when it is pressing upon a pack.

47. A sheet-holder adapted to support a pack of sheets upon their edges in a more or less upright position having an inclined front against which the pack may lean, in combination with devices for withdrawing sheets from the upper edge of that face of the pack which leans against the inclined front, independent pressers arranged in a series transversely across the sheet-holder and each adapted to rest against the rear or back of a pack of sheets along its upper edge and to press the sheets toward the inclined front and thereby hold the upper edges of the sheets against the action of the withdrawing devices, and means for supporting and guiding said pressers when in operation and for holding one or more of them in a retracted position when not required for use, consisting of the antifriction-rollers 153, 154, the rods 155, 156, the brackets 157, the guide-rails 158, the lower and upper ribs 161, the openings 162, the widened-out parts 163, and the peaks 164, substantially as described.

48. A sheet-holder adapted to support a pack of sheets upon their edges in a more or less upright position having an inclined front against which the pack may lean, in combination with devices for withdrawing sheets from the upper edge of that face of the pack which leans against the inclined front, a presser adapted to rest against the rear or back of the pack adjacent to its upper edge and to press the sheets toward the inclined front and thereby hold the upper edges of the sheets against the action of the withdrawing devices, guides adapted to support said presser and to guide it toward the said front, and a device to lift said guides above their normal positions and to return them again thereto whereby said presser may be lifted above the plane of the upper end of, and may be returned in the rear of the pack for the purpose described.

49. A sheet-holder adapted to support a pack of sheets upon their edges in a more or less upright position having an inclined front against which the pack may lean, in combination with devices for withdrawing sheets from the upper edge of that face of the pack which leans against the inclined front, a presser adapted to rest against the rear or back of the pack adjacent to its upper edge and to press the sheets toward the inclined front and thereby hold the upper edges of the sheets against the action of the withdrawing devices, guide-rails 158 adapted to support said presser and to guide it toward the said front, the transverse bars 159, 160 to which said rails are secured, and a device to support said bars and attached rails in their normal position and to lift them above their normal position and to return them again thereto whereby said presser may be supported and guided when in its operative position and when required may be lifted above the plane of the upper end of, and may be returned in the rear of the pack for the purpose described, said device consisting of the arms 165 to which said rails 160 are pivoted, the rock-shaft 166 carrying said arms 165, a hand device adapted to rock said shaft, and the guide-tracks 167 over which the bar 159 may move.

50. A sheet-holder adapted to support a pack of sheets upon their edges in a more or less upright position having an inclined front against which the pack may lean, in combination with devices for withdrawing sheets from the upper edge of that face of the pack which leans against the inclined front, independent pressers 151, 152 arranged in a series transversely across the sheet-holder and each adapted to rest against the rear or back of a pack of sheets along its upper edge and to press the sheets toward the inclined front and thereby hold the upper edges of the sheets against the action of the withdrawing devices, the brackets 157, rods 155, 156, antifriction-rollers 153, 154, guide-rails 158, lower and upper ribs 161, the pocket 169, transverse bars 159, 160, arms 165, rock-shaft 166, a hand device adapted to rock said shaft, and the guide-tracks 167, the said brackets, rods, rollers, rails, ribs, pocket, bars, arms, shaft, hand device, and tracks being adapted to support and to guide said pressers toward the said front when the pressers are in their operative positions and when required to lift the pressers above the plane of the upper end of, and to return them to the rear of the pack for the purpose described.

51. A sheet-holder adapted to support a pack of sheets upon their edges in a more or less upright position having an inclined front against which the pack may lean, in combination with devices for withdrawing sheets from the upper edge of that face of the pack which leans against the inclined front, a presser adapted to rest against the rear or back of the pack adjacent to its upper edge and to press the sheets toward the inclined front and thereby hold the upper edges of the sheets against the action of the withdrawing devices, guides adapted to support said presser and to guide it toward the said front, and a device to elevate said guides above their normal position and there temporarily to maintain them and thereafter to return them to their normal position whereby said presser may be lifted and temporarily maintained above the plane of the upper end of the pack and may then be returned to the rear of the pack, for the purpose described.

52. A sheet-holder adapted to support a pack of sheets upon their edges in a more or less upright position having an inclined front against which the pack may lean, in combination with devices for withdrawing sheets from the upper edge of that face of the pack which leans against the inclined front, a presser adapted to rest against the rear or back of the pack adjacent to its upper edge and to press the sheets toward the inclined front and thereby hold the upper edges of the sheets against the action of the withdrawing devices, guide-rails 158 adapted to support said presser and to guide it toward the said front, the transverse bars 159, 160 to which said rails are secured, and devices to support said bars and attached rails in their normal position and to elevate them above their normal position and there temporarily to maintain them and thereafter to return them to their normal position for the purpose described, said devices consisting of the arms 165 to which said rail 160 is pivoted, the rock-shaft 166 carrying said arms 165, a hand device adapted to rock said shaft, a locking device to secure said shaft from a return movement after it is rocked, and the guide-tracks 167 over which the bar 159 may move.

53. A sheet-holder adapted to support a pack of sheets upon their edges in a more or less upright position having an inclined front against which the pack may lean, in combination with devices for withdrawing sheets from the upper edge of that face of the pack which leans against the inclined front, independent pressers 151, 152, the brackets 157, rods 155, 156, antifriction-rollers 153, 154, guide-rails 158, lower and upper ribs 161, the pocket 169, transverse bars 159, 160, arms 165, rock-shaft 166, handle 170, rod 171, bosses 172, shoe 173, bent end 174, slot 175, latch 176, projection 177, and the guide-tracks 167, substantially as and for the purpose described.

54. A sheet-holder adapted to support a pack of sheets upon their edges in a more or less upright position having an inclined front against which the pack may lean with its end projecting above the front, in combination with a series of retaining-points arranged above the said front and adapted to retain the ends of the foremost sheets in proper alinement, an individualizing device adapted to raise a portion of the foremost sheet on that edge which is overlapped by said retaining-points, a series of reciprocating fingers adapted to operate in conjunction with said individualizing device and said retaining-points to bend the upper edge of the foremost sheet outward from the pack, a device operating on said fingers to cause them to press against the pack after they have operated to bend the edge of a sheet outward, a withdrawing device adapted to seize upon the outwardly-bent edge of a sheet and to withdraw the sheet from the pack, one or more pressers adapted to rest against the rear or back of a pack of sheets along its upper edge and to press the sheets toward the inclined front and thereby to operate in conjunction with said fingers when they press against the pack to clamp the upper ends of the sheets in the pack against the action of the withdrawing devices, and guides for supporting said presser or pressers and for guiding it or them toward the said front.

55. The combination of a sheet-conveyer having a traveling surface upon which sheets may be received and by which they may be moved or conveyed, a transverse pocket or depression across the said traveling surface, a rotating shaft extending transversely in said pocket or depression with its upper side substantially in line with the surface of the conveyer, a side gage having its registering edge parallel to the course of said conveyer, a frictional disk arranged above said shaft, located adjacent to said side gage, mounted with its face disposed diagonally to the course of the conveyer and with that edge of the disk which is most advanced in the direction toward which the sheets proceed closer to the registering edge of the side gage than the opposite edge of the disk, and adapted to press the sheets while they are being moved forward on the surface of the conveyer against said shaft and to draw them sidewise against the side gage, and a power device for rotating said disk.

56. The combination of an endless traveling apron adapted to receive sheets and to convey them over its surface, a group of rollers arranged to depress the plane of said apron so as to form a transverse pocket or depression in its surface, a rotating shaft extending transversely in said pocket or depression with its upper side substantially in line with the upper surface of said apron, a side gage having a registering edge parallel to the course of said apron, a frictional disk arranged above said shaft and a like frictional disk arranged above the apron at a point more forward in the direction of the course of the apron than the first said disk, each of said disks being located adjacent to said side gage, and each mounted with its face disposed diagonally to the course of the apron and with that edge of the disk which is most advanced in the direction toward which the sheets proceed closer to the registering edge of the side gage than the opposite edge of the disk, and each adapted to act conjointly with the other disk upon the sheets and to draw them sidewise against the side gage while they are being moved forward on the surface of the apron, and a power connection from said transverse shaft to said disks whereby each of said disks may be rotated.

57. The combination of a sheet-conveyer having a traveling surface upon which sheets may be received and by which they may be moved or conveyed, a side gage having its registering edge parallel to the course of said conveyer, the frictional disks 179, 180, spindles 189, 190, bearings 191, 192, studs 193, 194, springs 210, 211, projections 212, brackets 213, screws 214, and a power device to rotate said disks, for the purposes described.

58. The combination of a sheet-conveyer having a traveling surface upon which sheets may be received and by which they may be moved or conveyed, a side gage having its registering edge parallel to the course of said conveyer, a frictional disk adapted to operate in the manner described upon the sheets while they are being moved forward on the surface of the conveyer to draw them sidewise against the side gage, a spindle upon which said disk is mounted, a bearing to support said spindle, a driving-pulley mounted loosely upon said spindle, a power device to drive said pulley, and a ratchet connection between said pulley and said spindle, for the purpose set forth.

59. The combination of a sheet-conveyer having a traveling surface upon which sheets may be received and by which they may be moved or conveyed, a transverse pocket or depression across the said traveling surface by which the said surface is divided into rear and forward portions, a side gage extending over the forward portion of said traveling surface and embracing a lower plate 182 having an end 185 turned downward into said pocket or depression, a sheet-moving device adapted to engage the surface of a sheet upon the conveyer and to move the sheet laterally against the side gage, a support for said side gage and sheet-moving device and means for adjusting said gage and said sheet-moving device transversely on said support.

60. The combination of an endless traveling apron adapted to receive sheets and to convey them over its surface, a group of rollers arranged to depress the plane of said apron so as to form a transverse pocket or depression in its surface, a rotating shaft extending transversely in said pocket or depression with its upper side substantially in line with the upper surface of said apron, a side gage having a registering edge parallel to the course of said apron, a frictional disk arranged above said shaft and a like frictional disk arranged above the apron at a point more forward in the direction of the course of the apron than the first said disk, the said disks being adapted to operate in the manner described upon the sheets while they are being moved forward upon the surface of the conveyer to draw them sidewise against the side gage, an adjustable power connection from said shaft to said disks, a fixed support for said side gage, said disks and said power connection, and means for adjusting said side gage, disks, and power connection transversely on said support in such manner that each of said disks may be rotated in whatever transverse position they may be adjusted.

61. The combination of an endless traveling apron adapted to receive sheets and to convey them over its surface, a group of rollers arranged to depress the plane of said apron so as to form a transverse pocket or depression in its surface, a rotating shaft extending transversely in said pocket or depression with its upper side substantially in line with the upper surface of said apron, a side gage arranged over said apron and embracing a lower plate 182 having an end 185 turned downward into said pocket or depression, a frictional disk 179 arranged over said shaft and a like frictional disk 180 arranged above the apron at a point more forward in the direction of the course of the apron than the disk 179, the said disks being adapted to operate in the manner described upon the sheets while they are being moved forward on the surface of the apron to draw them sidewise against the side gage, the spindles 189, 190 upon which said disks are fixed, bearings 191, 192 for said spindles, the pulleys 202, 203 on said spindles, the carriage 187 carrying said gage and said bearings, the fixed transverse bar 188 supporting said carriage, an adjusting device for moving said carriage along said bar to adjust said side gage and said disks to any desired lateral position in reference to the endless apron, the pulley 197 carried by said shaft with capacity to move longitudinally on the shaft while being turned thereby, a driving connection from said pulley 197 to said pulleys 202, 203 carried by said carriage, and a connection between said carriage and said pulley 197 whereby the pulley will be moved along said shaft with every adjustment of the carriage and the power connection to the disks 179, 180 will not be broken by the adjustment of the said carriage.

62. The combination of an endless traveling apron 136 adapted to receive sheets and to convey them over its surface, a side gage arranged over said apron, a sheet-moving device adapted to engage the surface of a sheet upon the apron and move the sheet laterally against the side gage, a support for said side gage and sheet-moving device, means for adjusting said support and the side gage and sheet-moving device carried thereby transversely in respect to said apron, the transversely-arranged rollers 147, 148 over said apron the roller 147 being placed in the rear and the roller 148 being placed forward of said support, a series of binding-cords 144 adapted to hold the sheets upon said apron and arranged in such manner that those cords on that side of the apron over which the said support and the parts carried thereby traverse shall pass about the roller 147 and thence rearwardly while those cords on that side of the apron opposite said support pass about the roller 148 and thence rearwardly, for the purpose described.

63. The combination of an endless traveling apron 136, adapted to receive sheets and to convey them over its surface, a group of rollers arranged to depress the plane of said apron so as to form a transverse pocket or depression in its surface, a side gage embracing a lower plate 182 having an end 185 turned downward into said pocket or depression, a sheet-moving device adapted to engage the surface of a sheet upon the apron and move the sheet laterally against the side gage, a support for said side gage and sheet-moving device, means for adjusting said support and the side gage and sheet-moving device carried thereby transversely in respect to said apron, the transversely-arranged rollers 147, 148 over said apron the roller 147 being placed in the rear and the roller 148 being placed forward of said support, a series of binding-cords 144 adapted to hold the sheets upon said apron and arranged in such manner that those cords on that side of the apron over which the said support and the parts carried thereby traverse shall pass about the roller 147 and thence rearwardly while those cords on that side of the apron opposite said support pass about the roller 148 and thence rearwardly, for the purpose described.

64. The combination of individualizing and edge-bending devices adapted to operate upon an edge of the outermost sheet in a pack of sheets and bend it outward from the pack, withdrawing and conveying devices adapted to seize upon the outwardly-bent edge of the outermost sheet and withdraw the sheet from the pack and convey it therefrom, power devices to drive said withdrawing and conveying devices, a shaft from which said individualizing and edge-bending devices are driven, a variable-speed power device for driving said shaft, a positive power connection between said shaft and the periodically-operated mechanism of the machine to be supplied, a clutch between said shaft and said variable-speed power device, a clutch between said shaft and said positive power connection, and clutch-shifting mechanism for operating said clutches whereby said shaft may be disconnected from said positive power connection and connected to said variable-speed power device when sheets are to be fed at the lineal rate or may be disconnected from the variable-speed power device and connected to the positive power connection when sheets are to be fed at the constant rate, as set forth.

65. The combination of individualizing and edge-bending devices adapted to operate upon an edge of the outermost sheet in a pack of sheets and bend it outward from the pack, withdrawing and conveying devices adapted to seize upon the outwardly-bent edge of the outermost sheet and withdraw the sheet from the pack and convey it therefrom, power devices to drive said withdrawing and conveying devices, power devices for driving said individualizing and edge-bending devices in such manner as to adapt those devices for feeding sheets at either the lineal or the constant rate for the purposes described, the said power devices for driving said individualizing and edge-bending devices consisting of the shafts 224, 230, the cones 227, 229, the belt 228, a belt-shifting device for adjusting the position of said belt on said cones, a power connection from said shaft 224 to some source of power, a power connection from said shaft 230 to the periodically-operated mechanism of the machine to be supplied such that the shaft 230 may be driven synchronously with said mechanism, a clutch adapted to connect or disconnect said shaft 230 to or from said cone 229, a clutch adapted to connect or disconnect said shaft 230 to or from said power connection to said periodically-operated mechanism, a clutch-shifting device operating each of said clutches in such manner that when it connects one clutch the other will be disconnected, and a power connection between said shaft 230 and said individualizing and edge-bending devices.

In testimony of which invention I hereunto set my hand.

JOHN HENRY KNOWLES.

Witnesses:
ERNEST HOWARD HUNTER,
J. W. KENWORTHY.